United States Patent
Nakahori

(10) Patent No.: US 7,199,569 B1
(45) Date of Patent: Apr. 3, 2007

(54) SWITCHING POWER SUPPLY UNIT

(75) Inventor: Wataru Nakahori, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 11/540,671

(22) Filed: Oct. 2, 2006

(30) Foreign Application Priority Data

Sep. 30, 2005 (JP) ............... 2005-289019

(51) Int. Cl.
*H01F 17/00* (2006.01)

(52) U.S. Cl. ...................... 323/355; 336/180
(58) Field of Classification Search ................ 336/65, 336/83, 170, 180–185, 200, 232; 323/355; 363/21.01, 21.02
See application file for complete search history.

(56) References Cited

U.S. PATENT DOCUMENTS

| | | | | |
|---|---|---|---|---|
| 4,518,941 | A | * | 5/1985 | Harada ........................ 336/69 |
| 5,659,461 | A | * | 8/1997 | Inou et al. ............... 363/21.16 |
| 6,281,779 | B1 | * | 8/2001 | Matsumoto et al. ........ 336/200 |
| 6,859,130 | B2 | * | 2/2005 | Nakashima et al. ........ 336/200 |
| 6,879,235 | B2 | * | 4/2005 | Ichikawa ................... 336/200 |
| 6,972,656 | B2 | * | 12/2005 | Takeshima et al. ......... 336/180 |

FOREIGN PATENT DOCUMENTS

| | | |
|---|---|---|
| JP | Y2-06-2365 | 1/1994 |
| JP | A-06-38523 | 2/1994 |
| JP | A-08-78252 | 3/1996 |
| JP | B2-2722869 | 11/1997 |
| JP | B2-3057203 | 4/2000 |
| JP | B2-3087434 | 7/2000 |
| JP | B2-3361835 | 10/2002 |
| JP | A-2002-369528 | 12/2002 |
| JP | B2-3400443 | 2/2003 |
| WO | WO 00/79674 A1 | 12/2000 |

* cited by examiner

*Primary Examiner*—Tuyen T. Nguyen
(74) *Attorney, Agent, or Firm*—Oliff & Berridge, PLC

(57) ABSTRACT

A switching power supply unit is provided, in which core loss in a transformer or a level of heating due to AC resistance of the transformer can be reduced. A switching power supply unit has a transformer, an inverter circuit and a rectifier circuit. In a secondary side of the transformer, secondary wirings are connected to each other. In a primary side of the transformer, primary wirings are connected in series to each other, and connected to the inverter circuit to allow them to be driven in a time-divisional manner in phases opposite to each other in response to operation of the inverter circuit. The rectifier circuit has diodes connected to the secondary wirings to allow the secondary wirings to be driven in a time-divisional manner in phases opposite to each other in response to operation of the inverter circuit.

20 Claims, 25 Drawing Sheets

SWITCHING POWER SUPPLY UNIT

BACKGROUND OF THE INVENTION

1. Field of the Invention

The present invention relates to a switching power supply unit transforming an input AC voltage obtained by switching an input DC voltage by a transformer, and outputting an output DC voltage obtained by rectifying and smoothing the transformed output AC voltage, and particularly relates to a switching power supply unit preferably applicable using high switching frequency.

2. Description of the Related Art

Hitherto, various types of switching power supply units have been proposed and provided for practical use. As one of the units, a type is given, in which an input DC voltage from a high-voltage battery is switched by switching operation of a switching circuit connected to an input winding of a transformer, an input AC voltage obtained by switching is inputted into the input winding of the transformer, and output AC voltage transformed by the transformer is drawn out from an output winding of the transformer, as described in Japanese Unexamined Patent Publication Nos. 2002-369528 and 2001-314080. A voltage induced on the output winding in association with the switching operation of the switching circuit is rectified by a rectifier circuit, the rectified voltage is converted to an output DC voltage by a smoothing circuit, and the smoothed voltage is outputted.

In a switching power supply unit of this type, a switching element such as MOS-FET (Metal-Oxide Semiconductor Field-Effect Transistor) is used for the switching circuit for size reduction. In such a switching circuit, the switching element performs switching operation at high frequency such as 100 kHz or more, therefore an input AC voltage obtained by the switching is a high-frequency voltage. There has been a difficulty that when such a high-frequency input AC voltage is inputted into a transformer, AC resistance of the transformer is increased due to a skin effect or a proximity effect, consequently heating is caused, leading to reduction in efficiency. Thus, to decrease AC resistance of the transformer, for example, a structure where section area of a winding is reduced so that current is not concentrated only on a surface of the winding, or a structure where primary windings and secondary windings are stacked in an alternate (sandwiched) manner so that windings having the same current direction are not close to one another, is used for the transformer (Japanese Unexamined Patent Publication No. 6-38523).

SUMMARY OF THE INVENTION

However, when the winding of the transformer is stacked in the sandwiched manner as above, since area of opposed regions between the primary windings and the secondary windings is increased, line capacitance between the primary windings and the secondary windings is increased. As a result, ringing having large amplitude is generated in an output AC voltage of the transformer by LC resonance due to the line capacitance and series inductance (excitation inductance and leakage inductance) (refer to Japanese Examined Utility model Publication No. 6-2365). There has been a difficulty that when the ringing having the large amplitude is generated in this way, core loss in the transformer or a value of heating due to AC resistance of the transformer is increased, consequently efficiency is reduced.

In view of foregoing, it is desirable to provide a switching power supply unit, in which core loss in the transformer or a value of heating due to AC resistance of the transformer can be decreased by reducing ringing generated in the output AC voltage of the transformer.

A first switching power supply unit of an embodiment of the invention includes a transformer having a primary-winding group and a secondary-winding group, a switching circuit performing switching operation to allow a current direction of the primary-winding group to be changed in a time-divisional manner, and a rectifier-and-smoother circuit rectifying and smoothing AC voltage induced on the secondary-winding group in response to operation of the switching circuit. The primary-winding group includes a first primary-winding group and a second primary-winding group connected in series to each other, and the secondary-winding group includes a first secondary-winding group and a second secondary-winding group connected to each other. At that time, the first secondary-winding group and the second secondary-winding group are driven in a time-divisional manner in phases opposite to each other in response to operation of the switching circuit. Magnetic coupling between the first primary-winding group and the secondary-winding group is relatively strong when the first secondary-winding group is driven, while it is relatively loose when the second secondary-winding group is driven. On the other hand, magnetic coupling between the second primary-winding group and the secondary-winding group is relatively loose when the first secondary-winding group is driven, while it is relatively strong when the second secondary-winding group is driven. The word "group" means that one or at least two windings exist (hereinafter, mentioned in the same way).

In the first switching power supply unit of an embodiment of the invention, strength of magnetic coupling of the first primary-winding group and the second primary-winding group to the secondary-winding group is changed in phases opposite to each other in a time-divisional manner. At that time, current direction is opposite to each other in principle of the transformer between the first primary-winding group or the second primary-winding group, and the secondary-winding group. Accordingly, AC resistance is decreased in a winding group being more strongly magnetically coupled with the secondary-winding group among the primary-winding group because influence of a proximity effect is reduced, compared with a case that winding groups having the same current direction are approximated to each other. On the other hand, AC resistance is increased due to the proximity effect in a winding group being more loosely magnetically coupled with the secondary-winding group among the primary-winding group, compared with the winding group being more strongly magnetically coupled with the secondary-winding group among the primary-winding group.

In this way, while the first primary-winding group and the second primary-winding group have different impedances from each other, since they are connected in series to each other, AC current inputted from the switching circuit necessarily flows even into a winding group having higher AC resistance among the primary-winding group. Therefore, ringing generated in an output AC voltage of the transformer by LC resonance due to line capacitance of the transformer and series inductance of the transformer (excitation inductance and leakage inductance) is attenuated by AC resistance of the winding group having higher AC resistance among the primary-winding group.

A second switching power supply unit of the embodiment of the invention includes a transformer having a primary-winding group and a secondary-winding group, a switching circuit performing switching operation to allow a current direction of the primary-winding group to be changed in a time-divisional manner, and a rectifier-and-smoother circuit rectifying and smoothing AC voltage induced on the secondary-winding group in response to operation of the switching circuit. The primary-winding group includes a first primary-winding group and a second primary-winding group connected in series to each other, and the secondary-winding group includes a first secondary-winding group and a second secondary-winding group connected to each other. The first primary-winding group is disposed near the first secondary-winding group rather than the second secondary-winding group, and the second primary-winding group is disposed near the second secondary-winding group rather than the first secondary-winding group. The rectifier-and-smoother circuit has a first rectifier element and a second rectifier element, the first and second rectifier elements being connected to the secondary-winding group to allow the first secondary-winding group and the second secondary-winding group to be driven in a time-divisional manner in phases opposite to each other in response to operation of the switching circuit.

Here, when the transformer has a magnetic core having a center pillar, each of the first secondary-winding group, second secondary-winding group, first primary-winding group, and second primary-winding group may be configured by being wound in a cylindrical surface parallel to an extending direction of the center pillar, or wound in a plane perpendicular to the extending direction of the center pillar. Moreover, preferably, respective windings of the primary-winding group and respective windings of the secondary-winding group are alternately stacked, and more preferably, they are stacked vertically symmetrically in a stacking direction. For example, the first secondary-winding group, first primary-winding group, second secondary-winding group, and second primary-winding group are preferably stacked in that order, and more preferably the first secondary-winding group, first primary-winding group, second primary-winding group, and second secondary-winding group are stacked in that order.

In the second switching power supply unit of the embodiment of the invention, the first secondary-winding group and the second secondary-winding group are driven in a time-divisional manner in phases opposite to each other in response to operation of the switching circuit. The first primary-winding group is disposed near the first secondary-winding group rather than the second secondary-winding group, and the second primary-winding group is disposed near the second secondary-winding group rather than the first secondary-winding group. At that time, since the first primary-winding group is disposed near the first secondary-winding group rather than the second secondary-winding group, it is more strongly magnetically coupled with the secondary-winding group when the first secondary-winding group is driven, and it is more loosely magnetically coupled with the secondary-winding group when the second secondary-winding group is driven. On the other hand, since the second primary-winding group is disposed near the second secondary-winding group rather than the first secondary-winding group, it is more strongly magnetically coupled with the secondary-winding group when the second secondary-winding group is driven, and it is more loosely magnetically coupled with the secondary-winding group when the first secondary-winding group is driven. Here, current direction is opposite to each other in principle of the transformer between the first primary-winding group or the second primary-winding group, and the secondary-winding group. Accordingly, AC resistance is decreased in a winding group being more strongly magnetically coupled with the secondary-winding group among the primary-winding group because influence of a proximity effect is reduced, compared with a case that winding groups having the same current direction are approximated to each other. On the other hand, AC resistance is increased due to the proximity effect in a winding group being more loosely magnetically coupled with the secondary-winding group among the primary-winding group, compared with the winding group being more strongly magnetically coupled with the secondary-winding group among the primary-winding group.

In this way, while the first primary-winding group and the second primary-winding group have different impedances from each other, since they are connected in series to each other, AC current inputted from the switching circuit necessarily flows into a winding group having higher AC resistance among the primary-winding group. Therefore, ringing generated in an output AC voltage of the transformer by LC resonance due to line capacitance of the transformer and series inductance of the transformer (excitation inductance and leakage inductance) is attenuated by AC resistance of the winding group having higher AC resistance among the primary-winding group.

A third switching power supply unit of the embodiment of the invention includes: a transformer having a primary-winding group including a first primary-winding group and a second primary-winding group connected to each other, and a secondary-winding group including a first secondary-winding group and a second secondary-winding group connected to each other; a switching circuit performing switching operation to allow the first primary-winding group and the second primary-winding group to be driven in a time-divisional manner in phases opposite to each other; and a rectifier-and-smoother circuit rectifying and smoothing AC voltage induced on the secondary-winding group in response to operation of the switching circuit. At that time, the first secondary-winding group and the second secondary-winding group are driven in a time-divisional manner in phases opposite to each other in response to operation of the switching circuit. The first primary-winding group includes a first primary-sub-winding group and a second primary-sub-winding group connected in series to each other, magnetic coupling between the first primary-sub-winding group and the secondary-winding group being relatively strong when the first secondary-winding group is driven, while magnetic coupling between the second primary-sub-winding group and the secondary-winding group being relatively loose when the first secondary-winding group is driven. On the other hand, the second primary-winding group includes a third primary-sub-winding group and a fourth primary-sub-winding group connected in series to each other, magnetic coupling between the third primary-sub-winding group and the secondary-winding group being relatively strong when the second secondary-winding group is driven, while magnetic coupling between the fourth primary-sub-winding group and the secondary-winding group being relatively loose when the second secondary-winding group is driven.

In the third switching power supply unit of the embodiment of the invention, the first primary-winding group and the second primary-winding group are driven in phases opposite to each other in a time-divisional manner in response to operation of the switching circuit. At that time, in the first primary-winding group, a portion where magnetic coupling with the secondary-winding group is strong (first primary-sub-winding group) and a portion where magnetic coupling with the secondary-winding group is loose (second primary-sub-winding group) are formed. On the other hand, in the second primary-winding group, a portion where magnetic coupling with the secondary-winding group is strong (third primary-sub-winding group) and a portion where magnetic coupling with the secondary-winding group is loose (fourth primary-sub-winding group) are formed.

At that time, current direction is opposite to each other in principle of the transformer between the first primary-sub-winding group or the second primary-sub-winding group, and the secondary-winding group. Accordingly, AC resistance is decreased in the first primary-sub-winding group because influence of a proximity effect is reduced, compared with a case that winding groups having the same current direction are approximated to each other. On the other hand, AC resistance is increased due to the proximity effect in the second primary-sub-winding group, compared with the first primary-sub-winding group. Similarly, current direction is opposite to each other in principle of the transformer between the third primary-sub-winding group or the fourth primary-sub-winding group, and the secondary-winding group. Accordingly, AC resistance is decreased in the third primary-sub-winding group because influence of the proximity effect is reduced, compared with a case that winding groups having the same current direction are approximated to each other. On the other hand, AC resistance is increased due to the proximity effect in the fourth primary-winding group, compared with the third primary-sub-winding group.

In this way, while the first primary-sub-winding group and the second primary-sub-winding group, as well as the third primary-sub-winding group and the fourth primary-sub-winding group have different impedances from each other, respectively, since they are connected in series to each other, AC current inputted from the switching circuit necessarily flows even into a winding group having higher AC resistance among the primary-winding group. Therefore, ringing generated in an output AC voltage of the transformer by LC resonance due to line capacitance of the transformer and series inductance of the transformer (excitation inductance and leakage inductance) is attenuated by AC resistance of the winding group having higher AC resistance among the primary-winding group.

A fourth switching power supply unit of the embodiment of the invention includes: a transformer having a primary-winding group including a first primary-winding group and a second primary-winding group connected to each other, and a secondary-winding group including a first secondary-winding group and a second secondary-winding group connected to each other; a switching circuit performing switching operation to allow the first primary-winding group and the second primary-winding group to be driven in a time-divisional manner in phases opposite to each other; and a rectifier-and-smoother circuit rectifying and smoothing AC voltage induced on the secondary-winding group in response to operation of the switching circuit. The first primary-winding group includes a first primary-sub-winding group and a second primary-sub-winding group connected in series to each other, the first primary-sub-winding group being disposed near the first secondary-winding group rather than the second secondary-winding group, and the second primary-sub-winding group being disposed near the second secondary-winding group rather than the first secondary-winding group. On the other hand, the second primary-winding group includes a third primary-sub-winding group and a fourth primary-sub-winding group connected in series to each other, the third primary-sub-winding group being disposed near the second secondary-winding group rather than the first secondary-winding group, and the fourth primary-sub-winding group being disposed near the first secondary-winding group rather than the second secondary-winding group. The rectifier-and-smoother circuit has a first rectifier element and a second rectifier element connected to the secondary-winding group to allow the first secondary-winding group and the second secondary-winding group to be driven in a time-divisional manner in phases opposite to each other in response to operation of the switching circuit.

Here, when the transformer has a magnetic core having a center pillar, first primary-sub-winding group, second primary-sub-winding group, third primary-sub-winding group, fourth primary-sub-winding group, first secondary-winding group, and second secondary-winding group may be configured by being wound in a cylindrical surface parallel to an extending direction of the center pillar, or wound in a plane perpendicular to the extending direction of the center pillar. Moreover, preferably, respective windings of the primary-winding group and respective windings of the secondary-winding group are alternately stacked, and more preferably, they are stacked vertically symmetrically in a stacking direction. For example, the first secondary-winding group, first primary-winding group, second secondary-winding group, and second primary-winding group are preferably stacked in that order, and more preferably the first secondary-winding group, first primary-winding group, second primary-winding group, and second secondary-winding group are stacked in that order.

In the fourth switching power supply unit of the embodiment of the invention, the first secondary-winding group and the second secondary-winding group are driven in a time-divisional manner in phases opposite to each other in response to operation of the switching circuit. At that time, since the first primary-sub-winding group and the fourth primary-sub-winding group are disposed near the first secondary-winding group rather than the second secondary-winding group, they are more strongly magnetically coupled with the secondary-winding group when the first secondary-winding group is driven, but more loosely magnetically coupled with the secondary-winding group when the second secondary-winding group is driven. On the other hand, since the second primary-sub-winding group and the third primary-sub-winding group are disposed near the second secondary-winding group rather than the first secondary-winding group, they are more strongly magnetically coupled with the secondary-winding group when the second secondary-winding group is driven, but more loosely magnetically coupled with the secondary-winding group when the first secondary-winding group is driven. Here, current direction is opposite to each other in principle of the transformer between the primary-winding group and the secondary-winding group. Accordingly, AC resistance is decreased in the first primary-sub-winding group because influence of a proximity effect is reduced, compared with a case that winding groups having the same current direction are approximated to each other. On the other hand, AC resistance is increased due to the proximity effect in the second primary-sub-winding group, compared with the first primary-sub-winding group. AC resistance is decreased in the third primary-sub-winding group because influence of the proximity effect is reduced, compared with the case that winding groups having the same current direction are approximated to each other. On the other hand, AC resistance is increased due to the proximity effect in the fourth primary-sub-winding group, compared with the third primary-sub-winding group.

In this way, while the first primary-sub-winding group and the second primary-sub-winding group, as well as the third primary-sub-winding group and the fourth primary-sub-winding group have different impedances from each other, respectively, since they are connected in series to each other, AC current inputted from the switching circuit necessarily flows into a winding group having higher AC resistance among the primary-winding group. Therefore, ringing generated in an output AC voltage of the transformer by LC resonance due to line capacitance of the transformer and series inductance of the transformer (excitation inductance and leakage inductance) is attenuated by AC resistance of the winding group having higher AC resistance among the primary-winding group.

According to the first and second switching power supply unit of the embodiment of the invention, since the first primary-winding group and the second primary-winding group, which have different strength of magnetic coupling with the secondary-winding group from each other, are connected in series to each other, ringing generated in an output AC voltage of the transformer is attenuated by AC resistance of a winding group having higher AC resistance among the primary-winding group. Thus, core loss in the transformer or a value of heating due to AC resistance of the transformer is decreased, consequently efficiency is improved.

According to the third and fourth switching power supply unit of the embodiment of the invention, since the first primary-sub-winding group and the second primary-sub-winding group, which have different strength of magnetic coupling with the secondary-winding group from each other, are connected in series to each other, and the third primary-sub-winding group and the fourth primary-sub-winding group, which have different strength of magnetic coupling with the secondary-winding group from each other, are connected in series to each other, ringing generated in an output AC voltage of the transformer is attenuated by AC resistance of a winding group having higher AC resistance among the primary-winding group. Thus, core loss in the transformer or a value of heating due to AC resistance of the transformer is decreased, consequently efficiency is improved.

Other and further objects, features and advantages of the invention will appear more fully from the following description.

DETAILED DESCRIPTION OF THE PREFERRED EMBODIMENTS

Hereinafter, embodiments of the invention will be described in detail with reference to drawings.

First Embodiment

Figure 1:
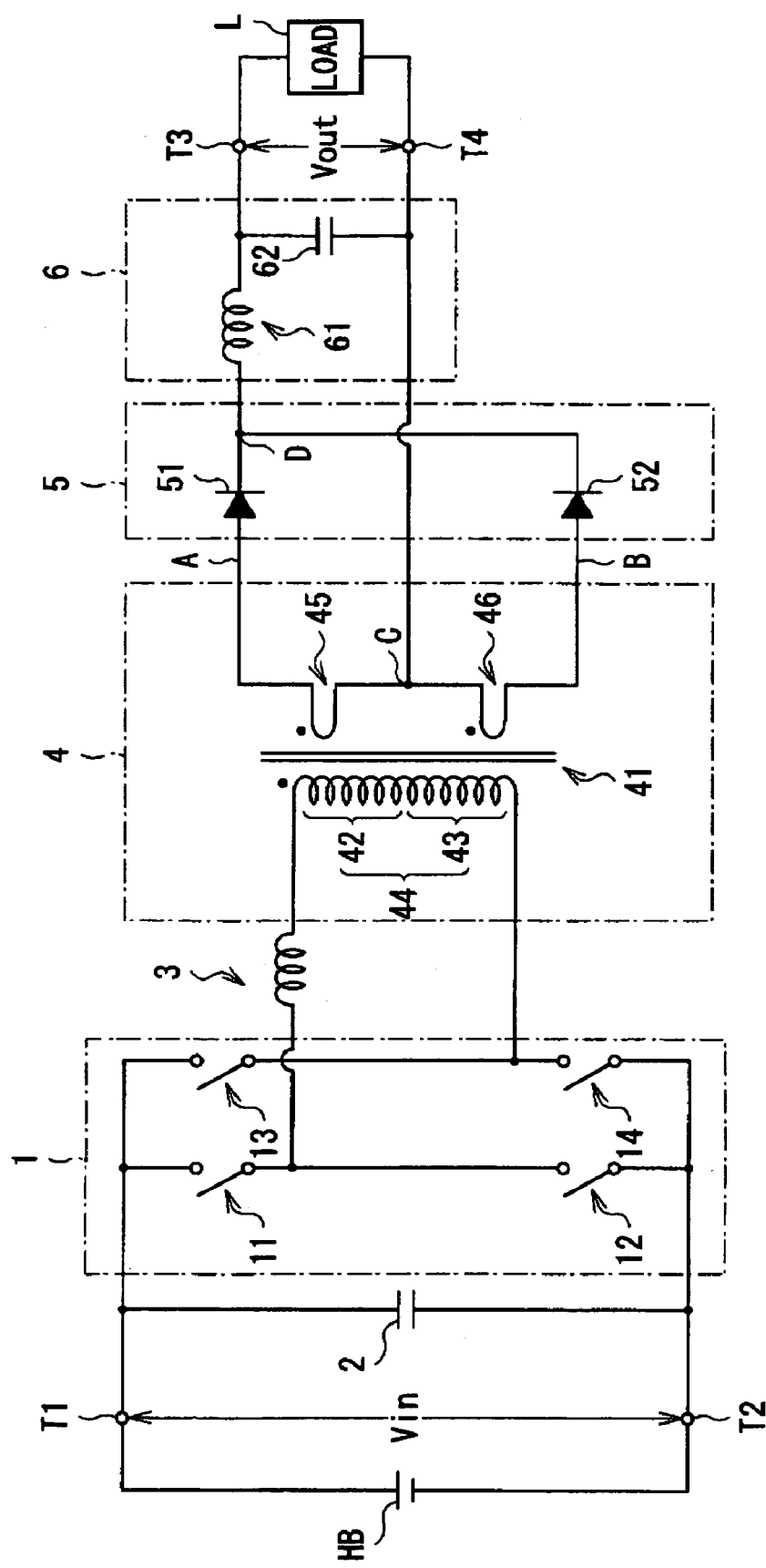
FIG. 1 is a circuit diagram of a switching power supply unit according to a first embodiment of the invention.
Figure 2:
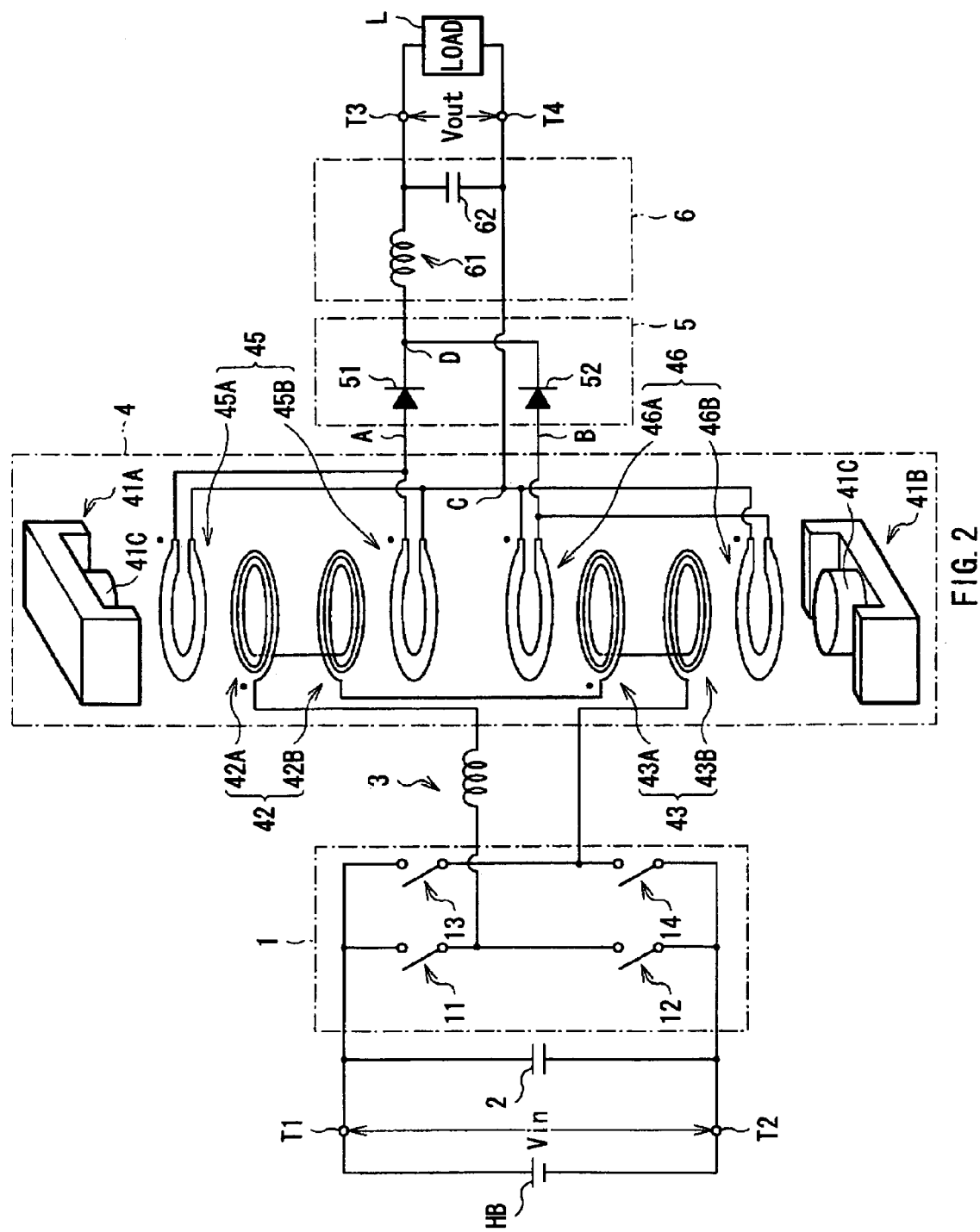
FIG. 2 is a structural drawing of the switching power supply unit of FIG. 1.

FIG. 1 shows a circuit configuration of a switching power supply unit according to a first embodiment of the invention. FIG. 2 shows a structure of a transformer in the switching power supply unit of FIG. 1 in an exploded manner. The switching power supply unit acts as a DC-to-DC converter converting a high DC input voltage Vin supplied from a high-voltage battery HB into a lower DC output voltage Vout, and supplying the DC output voltage to a load L, and is a switching power supply unit of which the secondary side is in a center tap type.

The switching power supply unit has an inverter circuit 1 (switching circuit) and a smoothing capacitor 2 provided between a primary-side high-voltage line L1H and a primary-side low-voltage line L1L; a transformer 4 configured to include a primary winding 44 including a primary winding 42 and a primary winding 43 connected in series to each other and a secondary winding 47 including a secondary winding 45 and a secondary winding 46 connected in series to each other; and a resonance inductor 3 provided between the inverter circuit 1 and the transformer 4. An input terminal T1 is provided in the primary-side high-voltage line L1H and an input terminal T2 is provided in the primary-side low-voltage line L1L, respectively, and the input terminals T1 and T2 are connected to output terminals of a high-voltage battery.

Furthermore, the switching power supply unit has a rectifier circuit 5 and a smoothing circuit 6 provided in the secondary side of the transformer 4. An output terminal T3 is provided in an output line L0 as a line at high voltage side of the smoothing circuit 6, and an output terminal T4 is provided in a ground line LG as a line at low voltage side of the smoothing circuit 6, and the output terminals T3 and T4 are connected to input and output terminals of a load. A circuit including the rectifier circuit 5 and the smoothing circuit 6 corresponds to an example of the "rectifier-and-smoothing circuit" of the invention.

The inverter circuit 1 is a single-phase inverter circuit converting the DC input voltage Vin outputted from the high-voltage battery into a single-phase AC voltage having an approximately rectangular wave shape. The inverter circuit 1 is a switching circuit in a full bridge type configured by full bridge connection of four switching elements 11, 12, 13 and 14 each of which is driven by a switching signal supplied from a control circuit (not shown). For example, an element of MOS-FET (Metal Oxide Semiconductor-Field Effect transistor), IGBT (Insulated Gate Bipolar Transistor) is used as the switching element.

The switching element 11 is provided between one end of the resonance inductor 3 and the primary-side high-voltage line L1H, and the switching element 12 is provided between one end of the resonance inductor 3 and the primary-side low-voltage line L1L. The switching element 13 is provided between one end of the primary wiring 43 of the transformer 4 and the primary-side high-voltage line L1H, and the switching element 14 is provided between one end of the primary wiring 43 and the primary-side low-voltage line L1L.

Accordingly, in the inverter circuit 1, in response to operation of the switching elements 11 and 14, current flows along a first current path from the primary-side high-voltage line L1H to the primary-side low-voltage line L1L through the switching element 11, resonance inductor 3, primary winding 42 and switching element 14 in this order. On the other hand, in response to operation of the switching elements 12 and 13, current flows along a second current path from the primary-side high-voltage line L1H to the primary-side low-voltage line L1L through the switching element 13, primary winding 42, resonance inductor 3, and switching element 12 in this order.

The resonance inductor 3 configures a resonance circuit in cooperation with parasitic capacitance of at least one of switching elements 11, 12, 13 and 14, and reduces power loss caused by on/off of the respective switching elements by using a resonance characteristic of the resonance circuit. While the resonance inductor 3 may be configured by actually disposing a coil component, it may be configured by using series inductance including leakage inductance of the transformer 4 or wiring in place of (in cooperation with) this.

The transformer 4 is a magnetic element having a primary winding 44 (primary-winding group) including a primary winding 42 (first primary-winding group) and a primary winding 43 (second primary-winding group) connected in series to each other, and a secondary winding 47 (secondary-winding group) including a secondary winding 45 (first secondary-winding group) and a secondary winding 46 (second secondary-winding group) connected in series to each other, the primary and the secondary windings 44 and 47 being magnetically coupled with each other by being wound on a magnetic core 41 to have polarity in the same direction. The transformer 4 is a stepdown type transformer, in which the number of turns of each of the secondary winding 45 and the secondary winding 46 is smaller than that of the primary winding 44. A stepdown level is determined by a ratio between the number of turns of the primary winding 44, and the number of turns of each of the secondary winding 45 and the secondary winding 46.

The magnetic core 41 has a figure-of-eight magnetic path, and for example, includes a magnetic core 41A and a magnetic core 41B in an E-shape, respectively, and is configured by setting the magnetic core 41A on a conductive substrate (not shown) and superposing the magnetic core 41B on the magnetic core 41A. The magnetic core 41B is superposed on the magnetic core 41A, thereby a cylindrical center pillar 41C is formed in a central portion of the magnetic core 41. The center pillar 41C is for winding the primary winding 44, secondary winding 45, and secondary winding 46 of the transformer 4.

The secondary winding 45 has a secondary winding 45A (first secondary-sub-winding group) and a secondary winding 45B (second secondary-sub-winding group) connected in parallel to each other, and the secondary winding 46 has a secondary winding 46A (third secondary-sub-winding group) and a secondary winding 46B (fourth secondary-sub-winding group) connected in parallel to each other. The secondary winding 45A, secondary winding 45B, secondary winding 46A, and secondary winding 46B are wound in one turn on the center pillar 41C in a plane perpendicular to an extending direction of the center pillar 41C, and layered in that order from above.

One end of the secondary winding 45 is connected to an anode of a diode 51 described later, and the other end of the secondary winding 45 is connected to a center tap C, respectively. One end of the secondary winding 46 is connected to an anode of a diode 52 described later, and the other end of the secondary winding 46 is connected to the center tap C, respectively. The center tap C is connected to the output terminal T4 via a ground line LG. That is, the secondary side of the transformer 4 is in a center tap type connection. The secondary winding 45 and the secondary winding 46 are driven in phases opposite to each other in a time-divisional manner by the rectifier circuit 5, as described later.

The primary winding 42 has a primary winding 42A (first primary-sub-winding group) and a primary winding 42B (second primary-sub-winding group) connected in series to each other. The primary winding 42A and the primary winding 42B are wound in three turns on the center pillar 41C in the plane perpendicular to the extending direction of the center pillar 41C, and layered in that order from above. Furthermore, the primary winding 42 is sandwiched by the secondary winding 45A and the secondary winding 45B, and the primary winding 42A is disposed close to the secondary winding 45A, and the primary winding 42B is disposed close to the secondary winding 45B. Accordingly, the primary winding 42 is disposed near the secondary winding 45 rather than the secondary winding 46.

The primary winding 43 has a primary winding 43A (third primary-sub-winding group) and a primary winding 43B (fourth primary-sub-winding group) connected in series to each other. The primary winding 43A and the primary winding 43B are wound in three turns on the center pillar 41C in the plane perpendicular to the extending direction of the center pillar 41C, and layered in that order from above. Furthermore, the primary winding 43 is sandwiched by the secondary winding 46A and the secondary winding 46B, and the primary winding 43A is disposed adjacently to the secondary winding 46A, and the primary winding 43B is disposed adjacently to the secondary winding 46B. Accordingly, the primary winding 43 is disposed near the secondary winding 46 rather than the secondary winding 45.

Accordingly, the transformer 4 has a structure where the primary winding (primary windings 42 and 43) and the secondary winding (secondary windings 45 and 46) are stacked in an alternate (sandwiched) manner, in which the primary winding 42 and the primary winding 43 having the same current direction are not close to each other. Moreover, respective windings of the transformer 4 are disposed by stacking the secondary winding 45A (first secondary-sub-winding group), primary winding 42A (first primary-sub-winding group), primary winding 42B (second primary-sub-winding group), secondary winding 45B (second secondary-sub-winding group), secondary winding 46A (third secondary-sub-winding group), primary winding 43A (third primary-sub-winding group), primary winding 43B (fourth primary-sub-winding group), and secondary winding 46B (fourth secondary-sub-winding group) in this order from above. That is, a stacking structure of the transformer 4 is vertically symmetrical.

Each of the primary winding 42 and the primary winding 43 are connected to the inverter circuit 1 to allow a direction of current flowing into the winding itself to be changed in response to operation of the inverter circuit 1. Specifically, one end of the primary winding 42 is connected to a connection point between the switching element 11 and the switching element 12 via the resonance inductor 3, and the other end of the primary winding 42 is connected to one end of the primary winding 43, and the other end of the primary winding 43 is connected to a connection point between the switching element 13 and the switching element 14.

The primary winding 42A, primary winding 42B, primary winding 43A, primary winding 43B, secondary winding 45A, secondary winding 45B, secondary winding 46A, and secondary winding 46B may be insulated from one another by air, or insulated from one another by interposing a not-shown insulating sheet.

Figure 3:
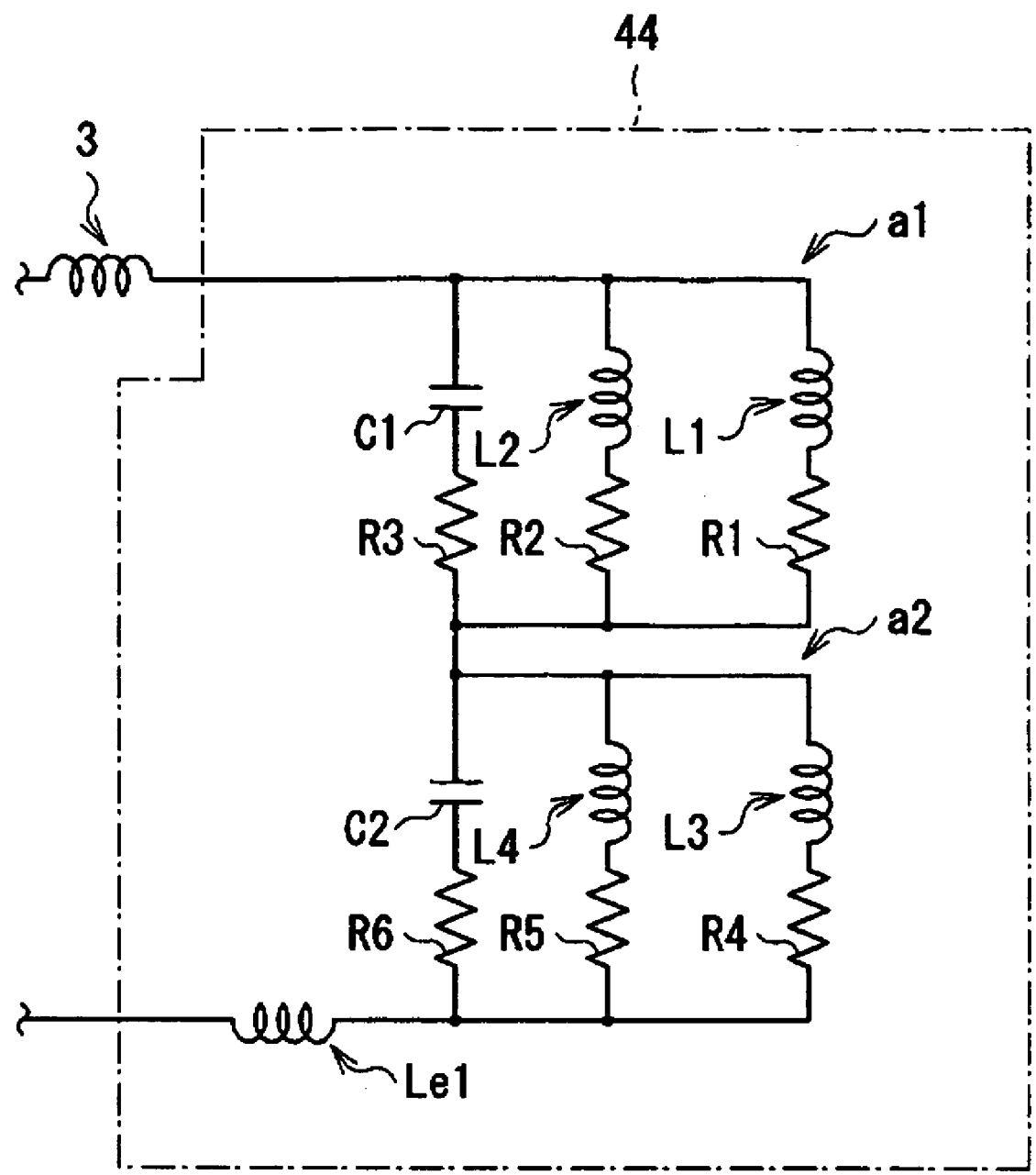
FIG. 3 is an equivalent circuit diagram of a primary winding of a transformer in FIG. 1.

Here, the primary winding, that is, the primary winding 44 including the primary winding 42 and the primary winding 43 can be expressed by an equivalent circuit as shown in FIG. 3. That is, the equivalent circuit is formed by a circuit a1, a circuit a2, and inductance Le1 connected in series to one another. The circuit a1 is configured by inductance L1 and resistance R1 connected in series to each other, inductance L2 and resistance R2 connected in series to each other, and line capacitance C1 and resistance R3 connected in series to each other, which are connected in parallel to one another. The circuit a2 is configured by connecting inductance L3 and resistance R4 connected in series to each other, inductance L4 and resistance R5 connected in series to each other, and line capacitance C2 and resistance R6 connected in series to each other, which are connected in parallel to one another.

In the above, the inductance L1 is inductance of the primary winding 42 when the transformer 4 is assumed as an ideal transformer, and the resistance R1 is resistance of the primary winding 42 when the transformer 4 is assumed as an ideal transformer. The inductance L2 is excitation inductance of the primary winding 42, and the resistance R2 is an AC resistance component of the primary winding 42. The line capacitance C1 is total capacitance of line capacitance in the primary winding 42 and line capacitance of the primary winding 42 and secondary windings 45 and 46; and the resistance R3 is an AC resistance component of the primary winding 42. The inductance L3 is inductance of the primary winding 43 when the transformer 4 is assumed as an ideal transformer, and the resistance R4 is resistance of the primary winding 43 when the transformer 4 is assumed as an ideal transformer. The inductance L4 is excitation inductance of the primary winding 43, and the resistance R5 is an AC resistance component of the primary winding 43. The line capacitance C2 is total capacitance of line capacitance in the primary winding 43 and line capacitance of the primary winding 43 and the secondary windings 45 and 46; and the resistance R6 is an AC resistance component of the primary winding 43. The inductance Le1 is leakage inductance of the transformer 4.

The rectifier circuit 5 is in a single-phase full-wave rectification type including a pair of diodes of a diode 51 (first rectifier element) and a diode 52 (second rectifier element). An anode of the diode 51 is connected to one end of the secondary winding 45, and a cathode of the diode 51 is connected to a connection point D, respectively. An anode of the diode 52 is connected to one end of the secondary winding 46, and a cathode of the diode 52 is connected to the connection point D, respectively. The connection point D is connected to an output terminal T3 via the smoothing circuit 6. Thus, in the rectifier circuit 5, the secondary winding 45 and the secondary winding 46 are driven in phases opposite to each other in a time-divisional manner.

The smoothing circuit 6 includes a chalk coil 61 and a smoothing capacitor 62, and produces a DC output voltage Vout by smoothing a DC voltage rectified by the rectifier circuit 5, and then supplies the voltage Vout to a load L from the output terminals T3 and T4.

Next, operation of the switching power supply unit in a configuration as above is described. While a case that the inverter circuit 1 is driven by typical switching operation is described below, the inverter circuit 1 may be driven by, for example, Zero Volt Switching operation.

When the switching elements 11 and 14 of the inverter circuit 1 are turned on, a current flows in a direction from the switching element 11 to the switching element 14, and a voltage Vin1 induces on the primary winding 44 of the transformer 4, and a current Iin1 flows into the primary winding 42 and the primary winding 43 configuring the primary winding 44. On the other hand, a voltage induces on the secondary windings 45 and 46 of the transformer 4, the voltage being in a reverse direction to the diode 52, and in a forward direction to the diode 51. Therefore, a current Iout1 flows into an output line LO and a ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

Next, when the switching elements 11 and 14 are switched from on to off, a voltage in a forward direction to the diode 52 induces on the secondary windings 45 and 46 of the transformer 4. Therefore, a current flows into the output line LO and the ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

Next, when the switching elements 12 and 13 are turned on, a current flows in a direction from the switching element 13 to the switching element 12, and a voltage Vin2 induces on the primary winding 44 of the transformer 4, and a current Iin2 flows into the primary winding 42 and the primary winding 43 configuring the primary winding 44. On the other hand, a voltage induces on the secondary windings 45 and 46 of the transformer 4, the voltage being in a forward direction to the diode 52, and in a reverse direction to the diode 51. Therefore, a current Iout2 flows into the output line LO and the ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

Finally, when the switching elements 12 and 13 are switched from on to off, a voltage in a forward direction to the diode 51 induces on the secondary windings 45 and 46 of the transformer 4. Therefore, a current flows into the output line LO and the ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

In this way, the switching power supply unit transforms (steps down) a DC input voltage Vin supplied from a high-voltage battery into a DC output voltage Vout, and feeds the transformed DC output voltage Vout to a low-voltage buttery.

Next, advantages of the switching power supply unit of the embodiment are described in comparison with a comparative example.

Figure 4:
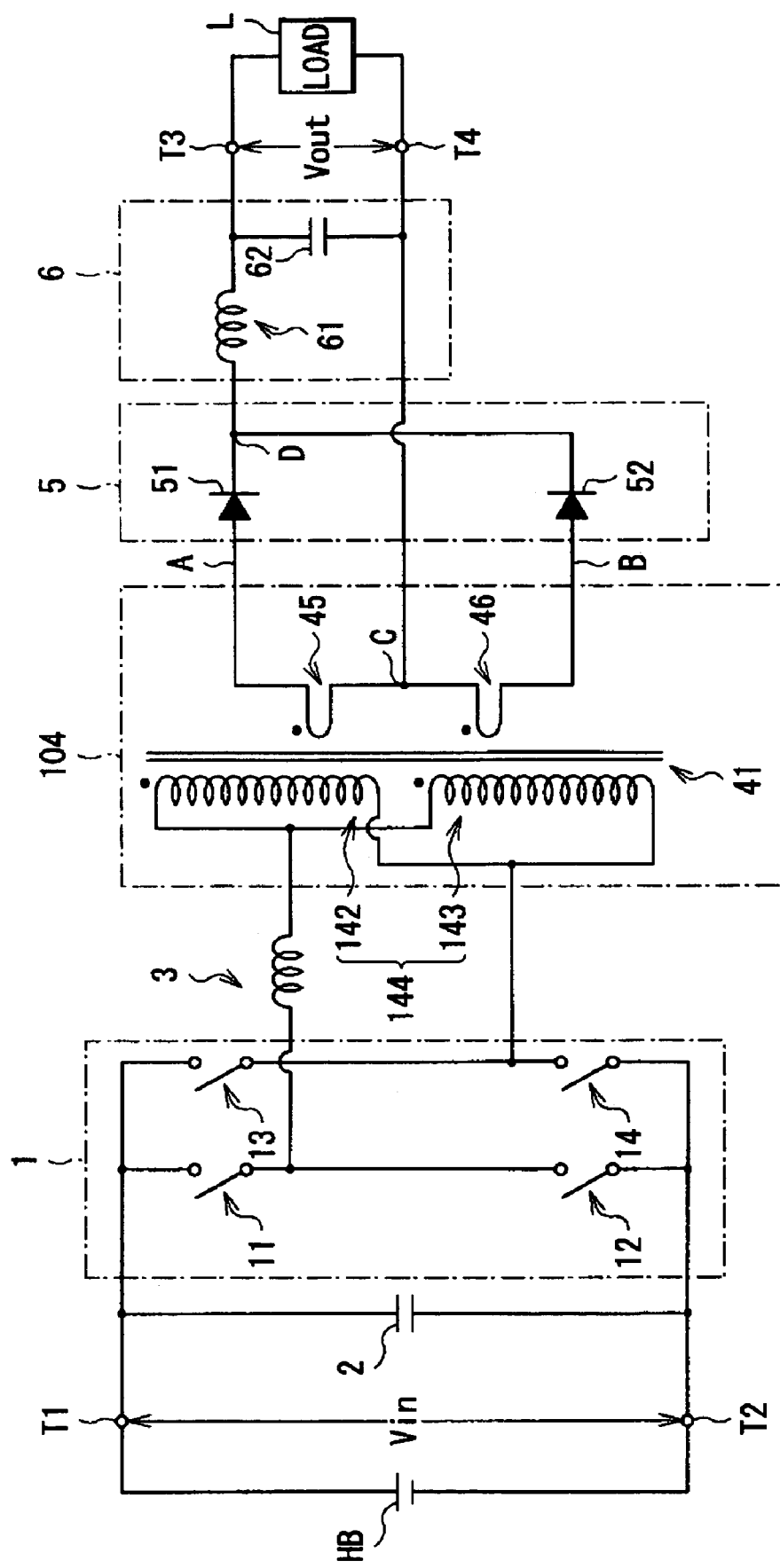
FIG. 4 is a circuit diagram of a switching power supply unit according to a comparative example.
Figure 5:
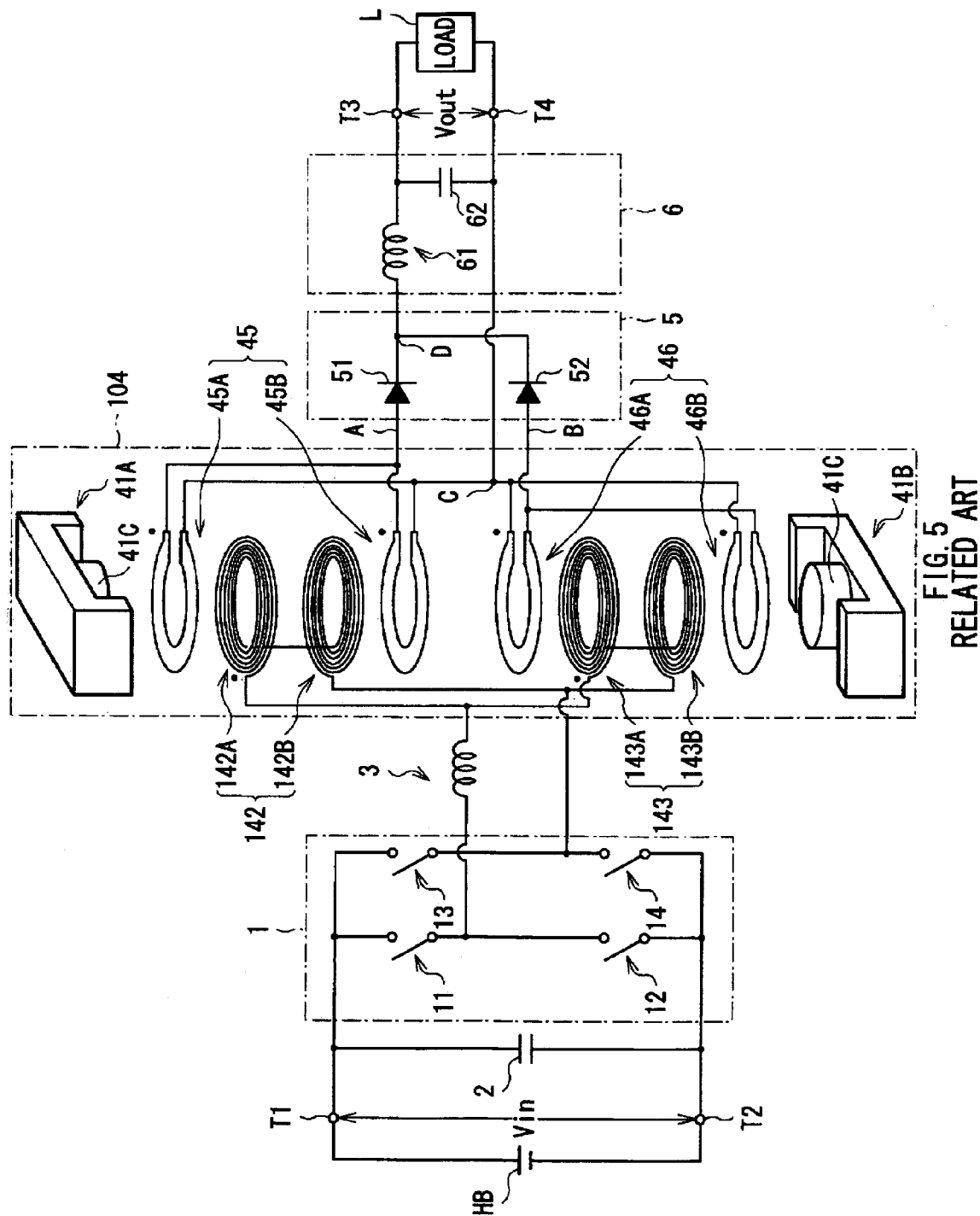
FIG. 5 is a structural drawing of the switching power supply unit of FIG. 4.

In the comparative example, a primary winding 144 of a transformer 104 includes a primary winding 142 and a primary winding 143 connected in parallel to each other as shown in FIGS. 4 and 5, and in this point, the comparative example is different from the primary winding 44 of the embodiment.

The primary winding 142 of the comparative example has a primary winding 142A and a primary winding 142B connected in series to each other, as the primary winding 42 of the embodiment. The primary winding 142A and the primary winding 142B are wound in six turns on the center pillar 41C in the plane perpendicular to the extending direction of the center pillar 41C, and layered in that order from above. In the light of equalizing a stepdown level of the transformer between the embodiment and the comparative example, the number of turns of the primary winding 142 is made twice the number of turns of the primary winding 42, that is, to be twelve turns. Furthermore, the primary winding 142 is sandwiched by a secondary winding 45A and a secondary winding 45B, and the primary winding 142A is disposed close to the secondary winding 45A, and the primary winding 142B is disposed close to the secondary winding 45B. Accordingly, the primary winding 142 is disposed near the secondary winding 45 rather than the secondary winding 46.

The primary winding 143 of the comparative example has a primary winding 143A and a primary winding 143B connected in series to each other. The primary winding 143A and the primary winding 143B are wound in six turns on the center pillar 41C in the plane perpendicular to the extending direction of the center pillar 41C, and layered in that order from above. In the light of equalizing a stepdown level of the transformer between the embodiment and the comparative example, the number of turns of the primary winding 143 is made twice the number of turns of the primary winding 43, that is, to be twelve turns. Furthermore, the primary winding 143 is sandwiched by a secondary winding 46A and a secondary winding 46B, and the primary winding 143A is disposed adjacently to the secondary winding 46A, and the primary winding 142B is disposed adjacently to the secondary winding 46B. Accordingly, the primary winding 143 is disposed near the secondary winding 46 rather than the secondary winding 45.

Figure 6:
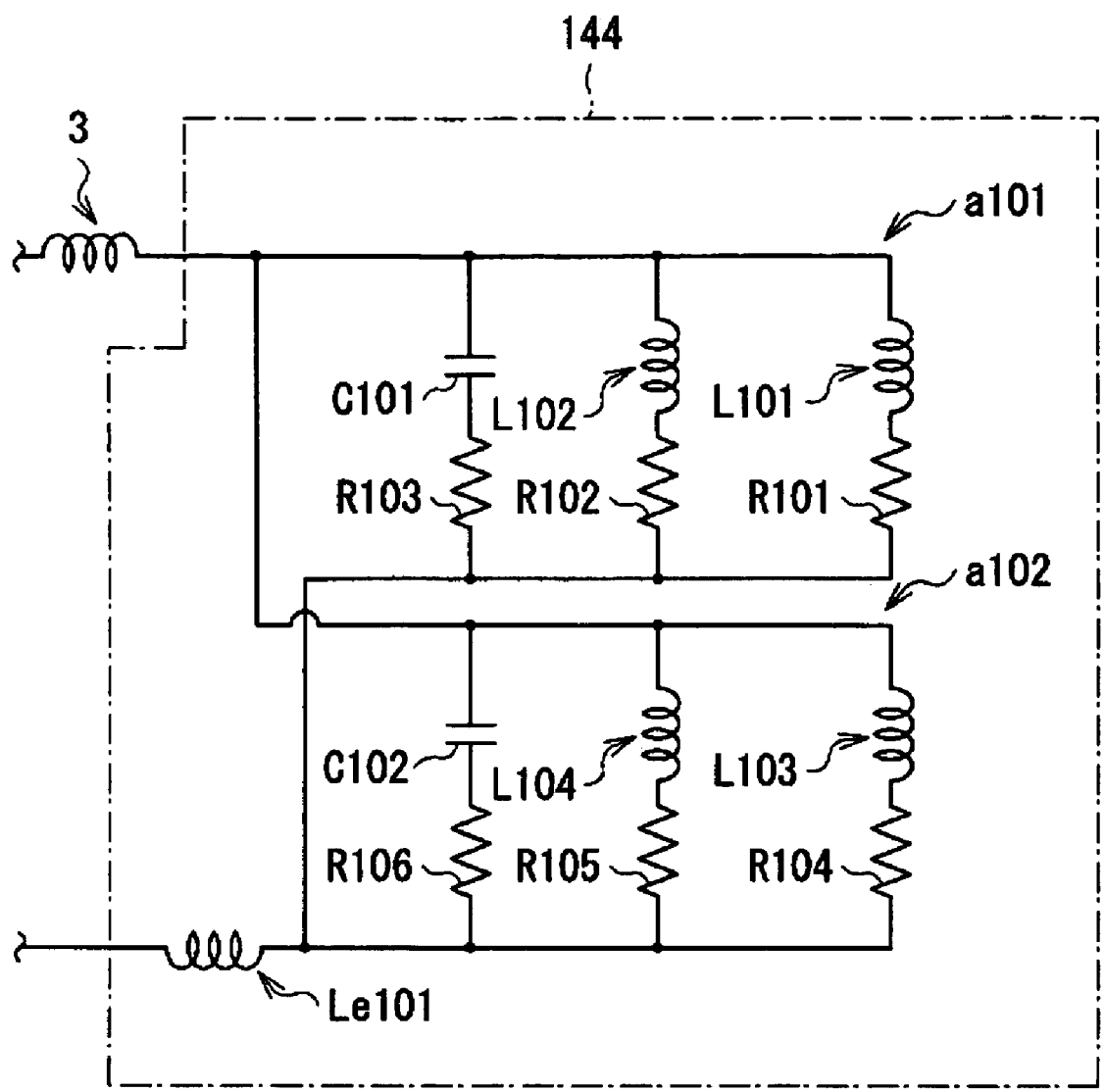
FIG. 6 is an equivalent circuit diagram of a primary winding of a transformer in FIG. 4.

Here, the primary winding of the transformer 104 of the comparative example, that is, the primary winding 144 including the primary winding 142 and the primary winding 143 can be expressed by an equivalent circuit as shown in FIG. 6. That is, the equivalent circuit is formed by a circuit including a circuit a101 and a circuit a102 connected in parallel to each other and inductance Le101, the circuit and the inductance Le101 being connected in series to each other. The circuit a101 is configured by inductance L101 and resistance R101 connected in series to each other, inductance L102 and resistance R102 connected in series to each other, and line capacitance C101 and resistance R103 connected in series to each other, which are connected in parallel to one another. The circuit a102 is configured by inductance L103 and resistance R104 connected in series to each other, inductance L104 and resistance R105 connected in series to each other, and line capacitance C102 and resistance R106 connected in series to each other, which are connected in parallel to one another.

In the above, the inductance L101 is inductance of the primary winding 142 when the transformer 104 is assumed as an ideal transformer, and the resistance R101 is resistance of the primary winding 142 when the transformer 104 is assumed as an ideal transformer. The inductance L102 is excitation inductance of the primary winding 142, and the resistance R102 is an AC resistance component of the primary winding 142. The line capacitance C101 is total capacitance of line capacitance in the primary winding 142 and line capacitance of the primary winding 142 and secondary windings 145 and 146; and the resistance R103 is an AC resistance component of the primary winding 142. The inductance L103 is inductance of the primary winding 143 when the transformer 104 is assumed as an ideal transformer, and the resistance R104 is resistance of the primary winding 143 when the transformer 40 is assumed as an ideal transformer. The inductance L104 is excitation inductance of the primary winding 143, and the resistance R105 is an AC resistance component of the primary winding 143. The line capacitance C102 is total capacitance of line capacitance in the primary winding 143 and line capacitance of the primary winding 143 and the secondary windings 145 and 146; and the resistance R106 is an AC resistance component of the primary winding 143. The inductance Le101 is leakage inductance of the transformer 104.

Figure 7:
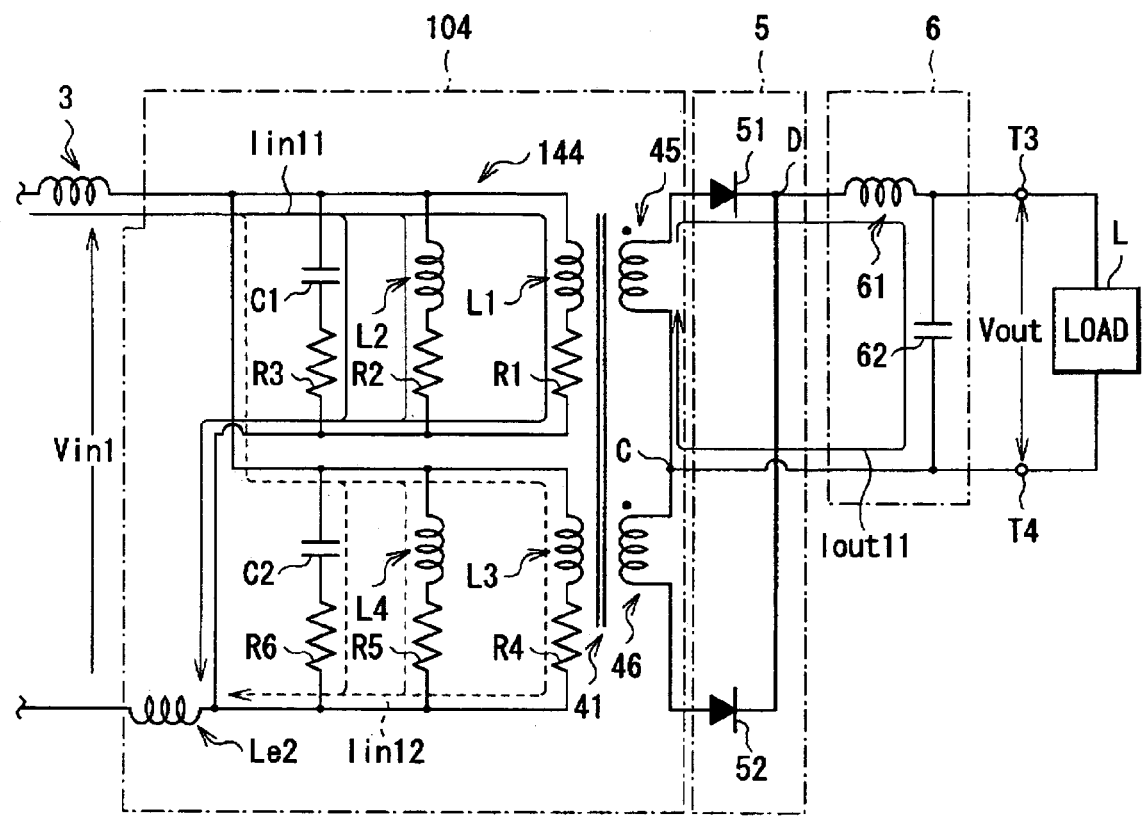
FIG. 7 is a circuit diagram for explaining operation of the switching power supply unit of FIG. 4.

In the comparative example, as shown in FIG. 7, when a voltage Vin1 is inputted into the primary winding 144, a current Iin11 flows into the primary winding 142, and a current Iin12 flows into the primary winding 143, respectively. Here, since the primary winding 142 is disposed nearer to the secondary winding 45 into which current is flowing, it strongly magnetically coupled with the secondary winding 45. At that time, since a current direction is opposite to each other in principle of the transformer between the primary winding 142 and the secondary winding 45, AC resistance is decreased in the primary winding 142 because influence of the proximity effect is reduced, compared with a case that winding groups having the same current direction are approximated to each other. Thus, relatively large current flows into the primary winding 142. On the other hand, since the primary winding 143 is disposed far from the secondary winding 45 into which current is flowing, it loosely magnetically coupled with the secondary winding 45. At that time, since the primary winding 143 is disposed relatively near to the secondary winding 46 into which current is not flowing, AC resistance is increased in the primary winding 143 due to the proximity effect, compared with the primary winding 142. Accordingly, only a relatively small current flows into the primary winding 143.

Figure 8:
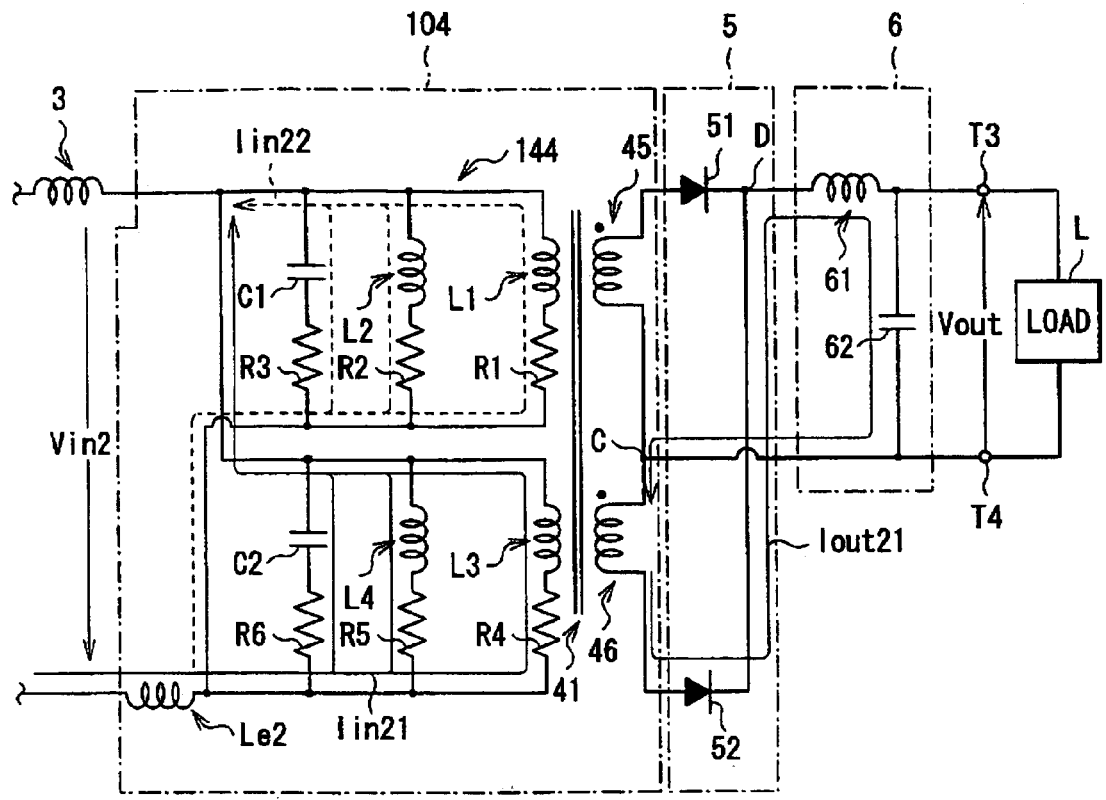
FIG. 8 is another circuit diagram for explaining operation of the switching power supply unit of FIG. 4.

Moreover, as shown in FIG. 8, when a voltage Vin2 is inputted into the primary winding 144, a current Iin22 flows into the primary winding 142, and a current Iin21 flows into the primary winding 143, respectively. Here, since the primary winding 143 is disposed nearer to the secondary winding 46 into which current is flowing, it strongly magnetically coupled with the secondary winding 46. At that time, since a current direction is opposite to each other in principle of the transformer between the primary winding 143 and the secondary winding 46, AC resistance is decreased in the primary winding 143 because influence of the proximity effect is reduced, compared with a case that winding groups having the same current direction are approximated to each other. Thus, relatively large current flows into the primary winding 143. On the other hand, since the primary winding 142 is disposed far from the secondary winding 46 into which current is flowing, it loosely magnetically coupled with the secondary winding 46. At that time, since the primary winding 142 is disposed relatively near the secondary winding 45 into which current is not flowing, AC resistance is increased in the primary winding 142 due to the proximity effect, compared with the primary winding 143. Accordingly, only a relatively small current flows into the primary winding 142.

Figure 9:
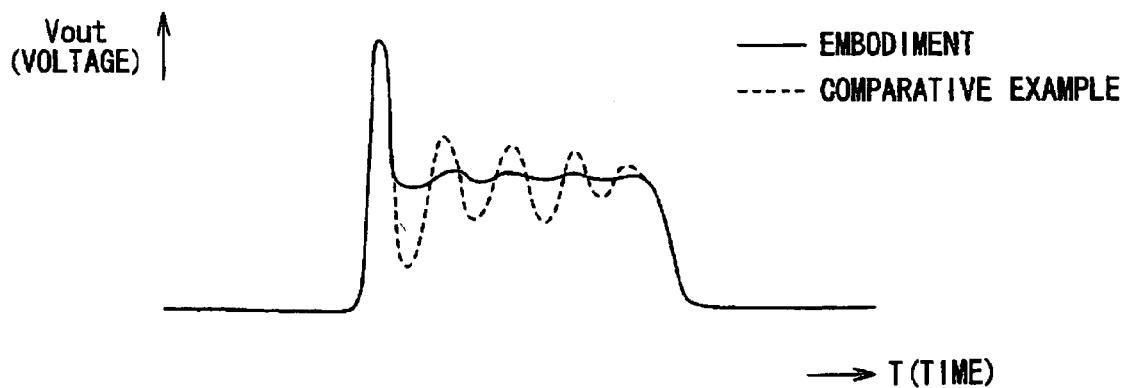
FIG. 9 is a waveform diagram of an output AC voltage of the transformers in FIGS. 1 and 4.

In this way, in the comparative example, since the primary winding 142 and the primary winding 143 are connected in parallel to each other, a current flows more into a winding having lower AC resistance. Therefore, ringing generated in an output AC voltage of the transformer 104 (voltage between an end A and an end B in FIGS. 4 and 5) can be hardly attenuated by low AC resistance (refer to a waveform shown by a dotted line in FIG. 9), the ringing being caused by LC resonance due to line capacitance C1 and C2 of the transformer 104, excitation inductance L2 and L4 of the transformer 104, and leakage inductance Le1 of the transformer 104. As a result, core loss in the transformer 104 or a level of heating due to AC resistance of the transformer 104 is increased, consequently efficiency is reduced.

Figure 10:
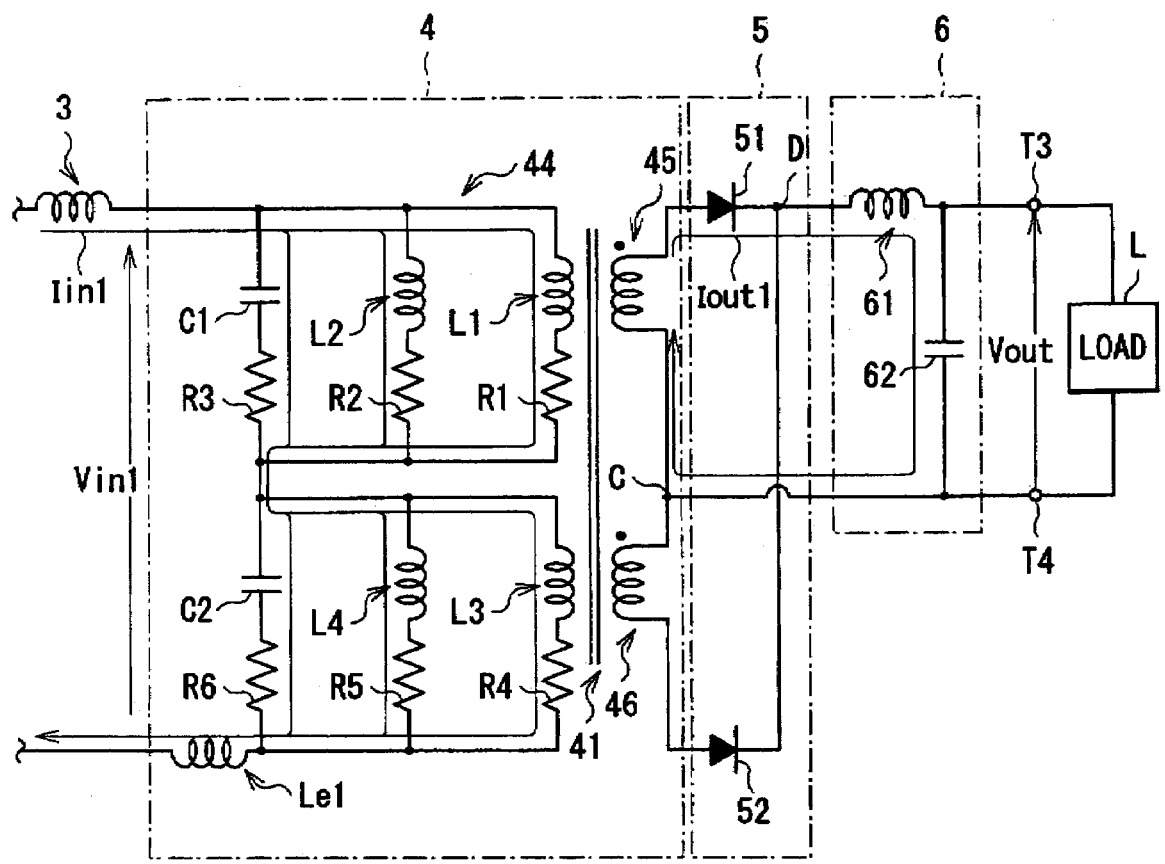
FIG. 10 is a circuit diagram for explaining operation of the switching power supply unit of FIG. 1.

On the other hand, in the embodiment, as shown in FIG. 10, when the voltage Vin1 is inputted into the primary winding 44, the current Iin1 flows into the primary winding 42 and the primary winding 43 configuring the primary winding 44. Here, since the primary winding 42 is disposed nearer to the secondary winding 45 into which current is flowing, it magnetically coupled with the secondary winding 45 relatively strongly. At that time, since a current direction is opposite to each other in principle of the transformer between the primary winding 42 and the secondary winding 45, AC resistance is decreased in the primary winding 42 because influence of the proximity effect is reduced, compared with a case that winding groups having the same current direction are approximated to each other. On the other hand, since the primary winding 43 is disposed far from the secondary winding 45 into which current is flowing, it magnetically coupled with the secondary winding 45 relatively loosely. At that time, since the primary winding 43 is disposed nearer to the secondary winding 46 into which current is not flowing, AC resistance is increased in the primary winding 43 due to the proximity effect, compared with the primary winding 42. However, since the primary winding 42 and the primary winding 43 are connected in series to each other in the embodiment, the same current flows into each of the primary winding 42 and the primary winding 43.

Figure 11:
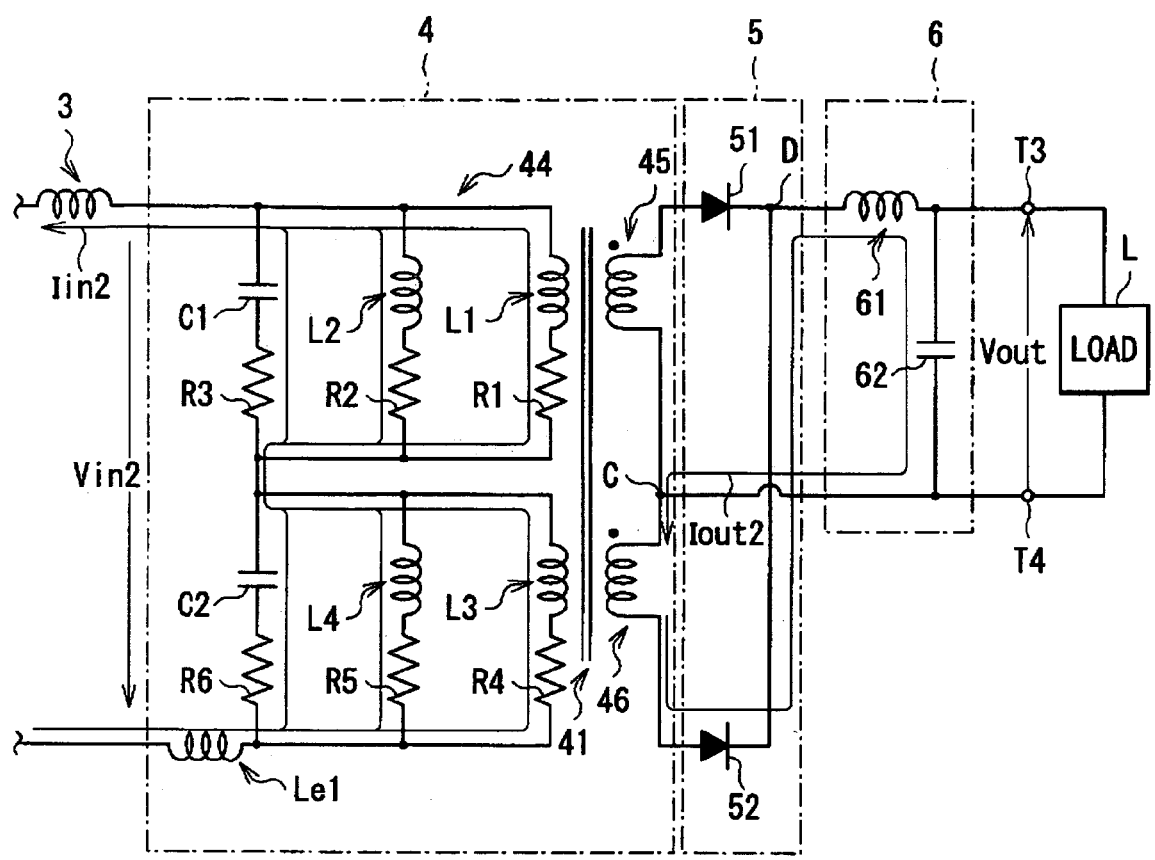
FIG. 11 is another circuit diagram for explaining operation of the switching power supply unit of FIG. 1.

Moreover, as shown in FIG. 11, when the voltage Vin2 is inputted into the primary winding 44, the current Iin2 flows into the primary winding 42 and the primary winding 43 configuring the primary winding 44. Here, since the primary winding 43 is disposed nearer to the secondary winding 46 into which current is flowing, it magnetically coupled with the secondary winding 46 relatively strongly. At that time, since a current direction is opposite to each other in principle of the transformer between the primary winding 43 and the secondary winding 46, AC resistance is decreased in the primary winding 43 because influence of the proximity effect is reduced, compared with a case that winding groups having the same current direction are approximated to each other. On the other hand, since the primary winding 42 is disposed far from the secondary winding 46 into which current is flowing, it magnetically coupled with the secondary winding 46 relatively loosely. At that time, since the primary winding 42 is disposed nearer to the secondary winding 45 into which current is not flowing, AC resistance is increased in the primary winding 42 due to the proximity effect, compared with the primary winding 43. However, since the primary winding 42 and the primary winding 43 are connected in series to each other in the embodiment, the same current flows into each of the primary winding 42 and the primary winding 43.

In this way, in the embodiment, since the primary winding 42 and the primary winding 43 are connected in series to each other, a current flows much even into a winding having large AC resistance. Therefore, ringing generated in an output AC voltage of the transformer 4 (voltage between an end A and an end B in FIGS. 1 and 2) can be attenuated by high AC resistance (refer to the waveform shown by the solid line in FIG. 9), the ringing being caused by LC resonance due to line capacitance C1 and C2 of the transformer 4, excitation inductance L2 and L4 of the transformer 4, and leakage inductance Le1 of the transformer 4. As a result, core loss in the transformer 4 or a level of heating due to AC resistance of the transformer 4 is decreased, consequently efficiency is improved.

Moreover, since a stacking structure of respective windings of the transformer 4 (primary winding 42A, primary winding 42B, primary winding 43A, primary winding 43B, secondary winding 45A, secondary winding 45B, secondary winding 46A, and secondary winding 46B) is vertically symmetrical in the embodiment, a magnitude of AC resistance of the transformer 4 is not substantially different between a case that the secondary winding 45 is driven, and a case that the secondary winding 46 is driven. Accordingly, since an attenuation level of ringing is not substantially different between an output AC voltage when the secondary winding 45 is driven and an output AC voltage when the secondary winding 46 is driven, a heating level is not periodically increased, consequently high efficiency can be kept.

Modification of the First Embodiment

Figure 12:
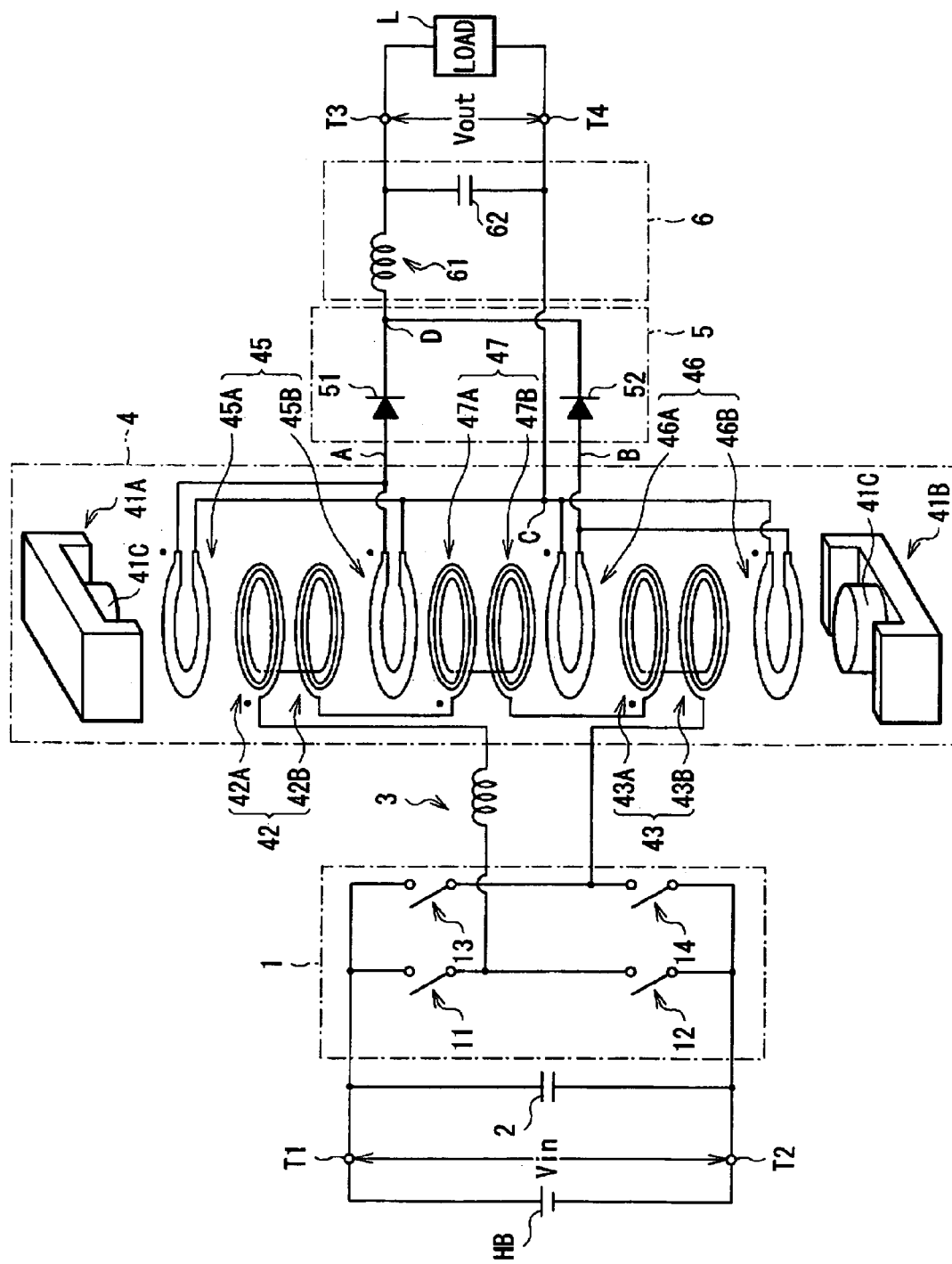
FIG. 12 is a circuit diagram of a switching power supply unit according to a modification.
Figure 13:
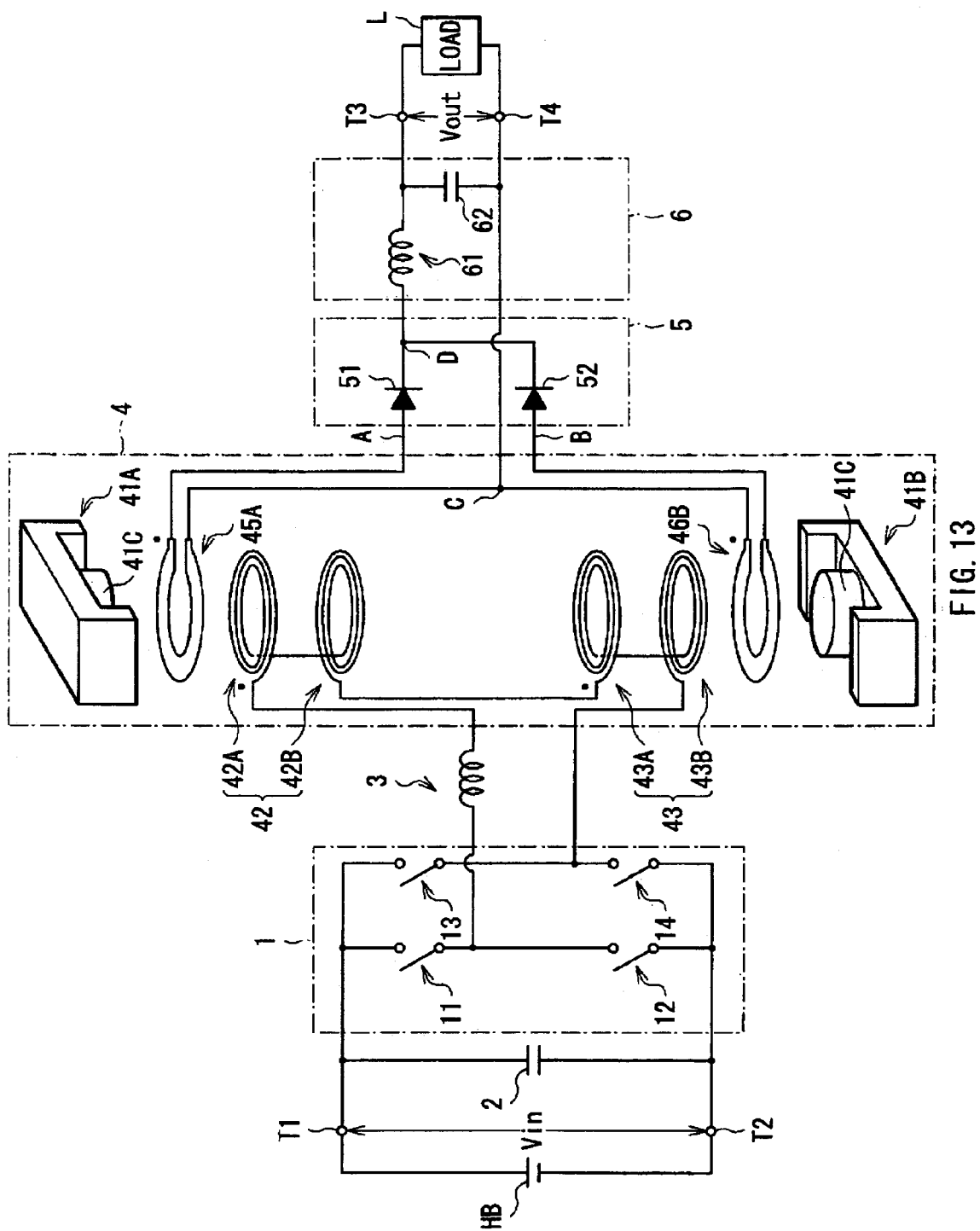
FIG. 13 is a circuit diagram of a switching power supply unit according to another modification.
Figure 14:
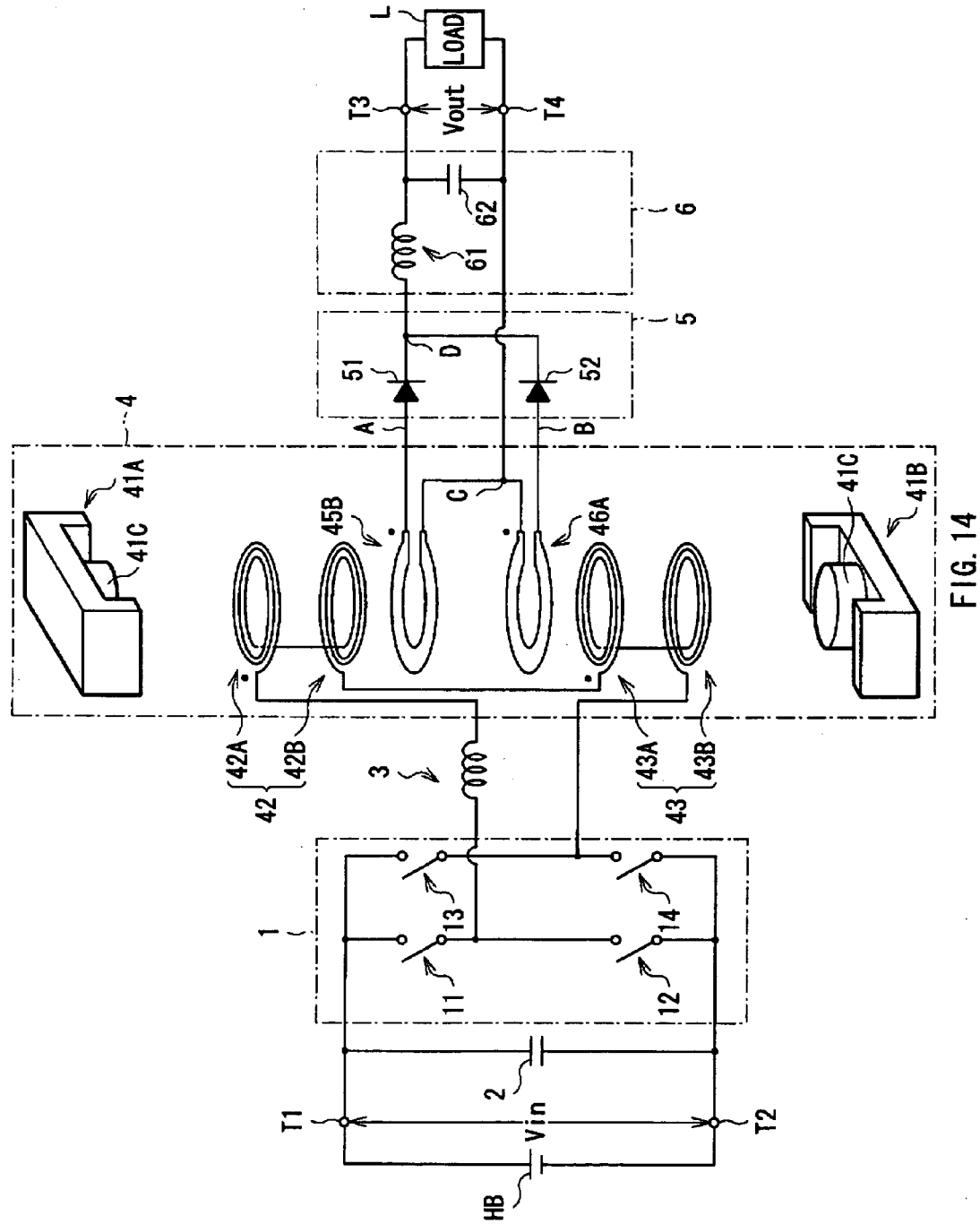
FIG. 14 is a circuit diagram of a switching power supply unit according to still another modification.
Figure 15:
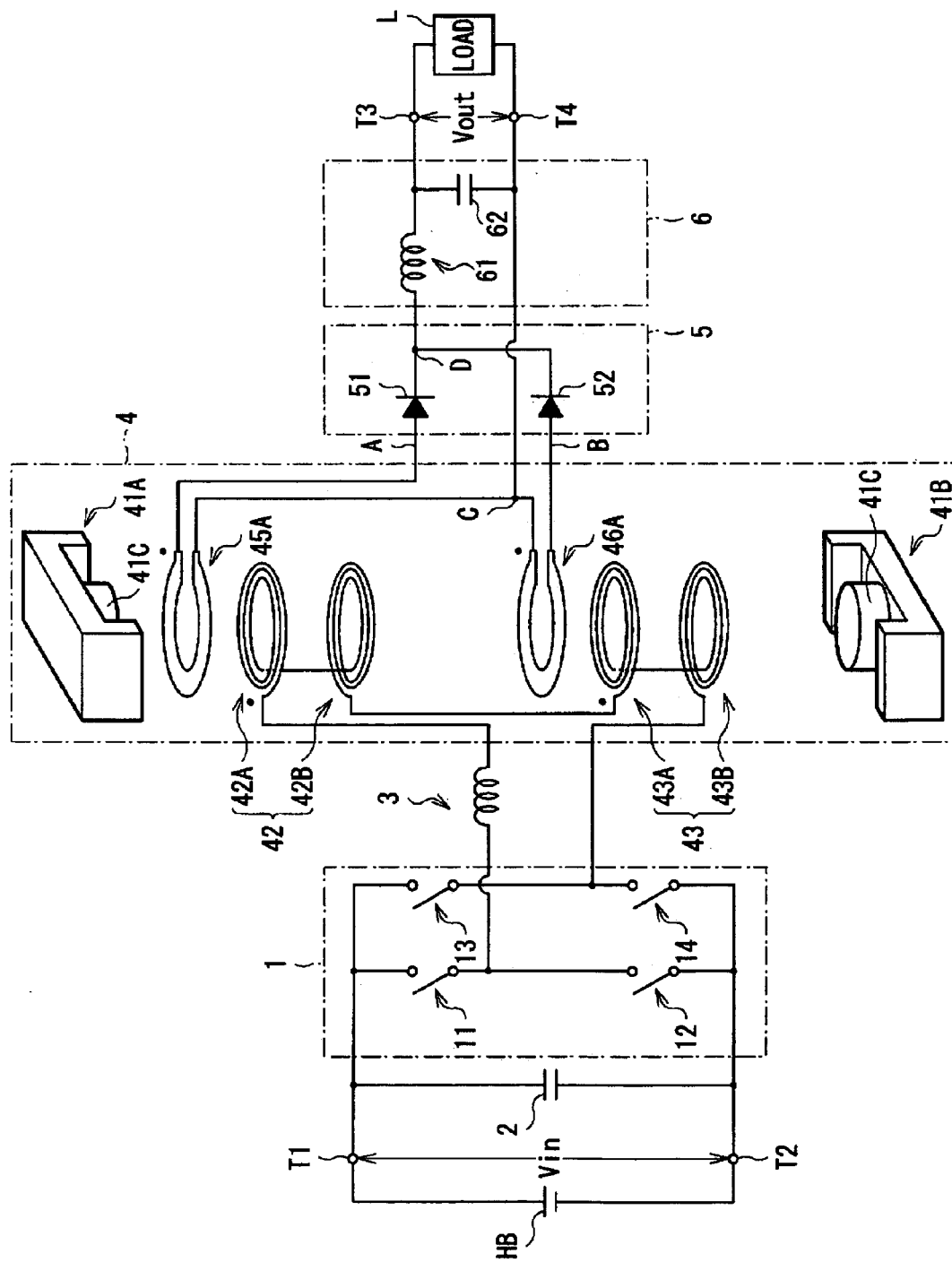
FIG. 15 is a circuit diagram of a switching power supply unit according to still another modification.

While respective windings of the transformer 4 are disposed by stacking the secondary winding 45A, primary winding 42A, primary winding 42B, secondary winding 45B, secondary winding 46A, primary winding 43A, primary winding 43B, and secondary winding 46B in this order from above in the embodiment, a third primary winding 47 formed by stacking a third primary winding 47A and a third primary winding 47B in that order from above may be disposed between the secondary winding 45B and the secondary winding 46A while vertically symmetric arrangement is kept, as shown in FIG. 12. Moreover, the secondary winding 45B and the secondary winding 46A may be omitted while vertically symmetric arrangement is kept as shown in FIG. 13, or the secondary winding 45A and the secondary winding 46B may be omitted as shown in FIG. 14. While vertically symmetric arrangement is not given, the secondary winding 45B and the secondary winding 46B may be omitted as shown in FIG. 15. In each case, it is enough that large AC resistance is disposed in series in the primary winding 44.

Moreover, while respective windings of the transformer 4 is wound on the center pillar 41C in the plane perpendicular to the extending direction of the center pillar 41C in the embodiment, they may be wound on the center pillar 41C in a cylindrical surface parallel to the extending direction of the center pillar 41C, as shown in FIGS. 16 to 19.

Second Embodiment

Figure 20:
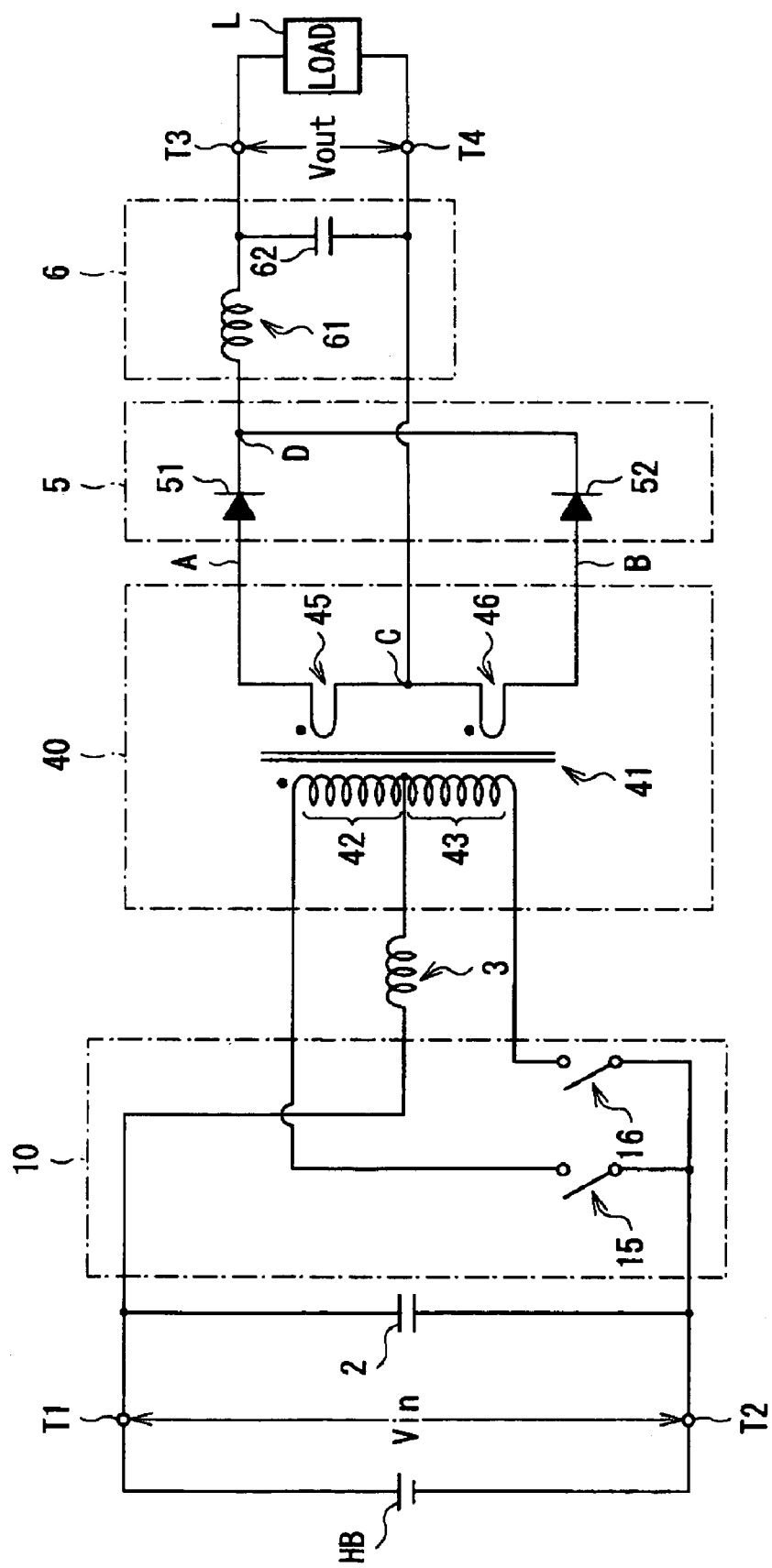
FIG. 20 is a circuit diagram of a switching power supply unit according to a second embodiment of the invention.
Figure 21:
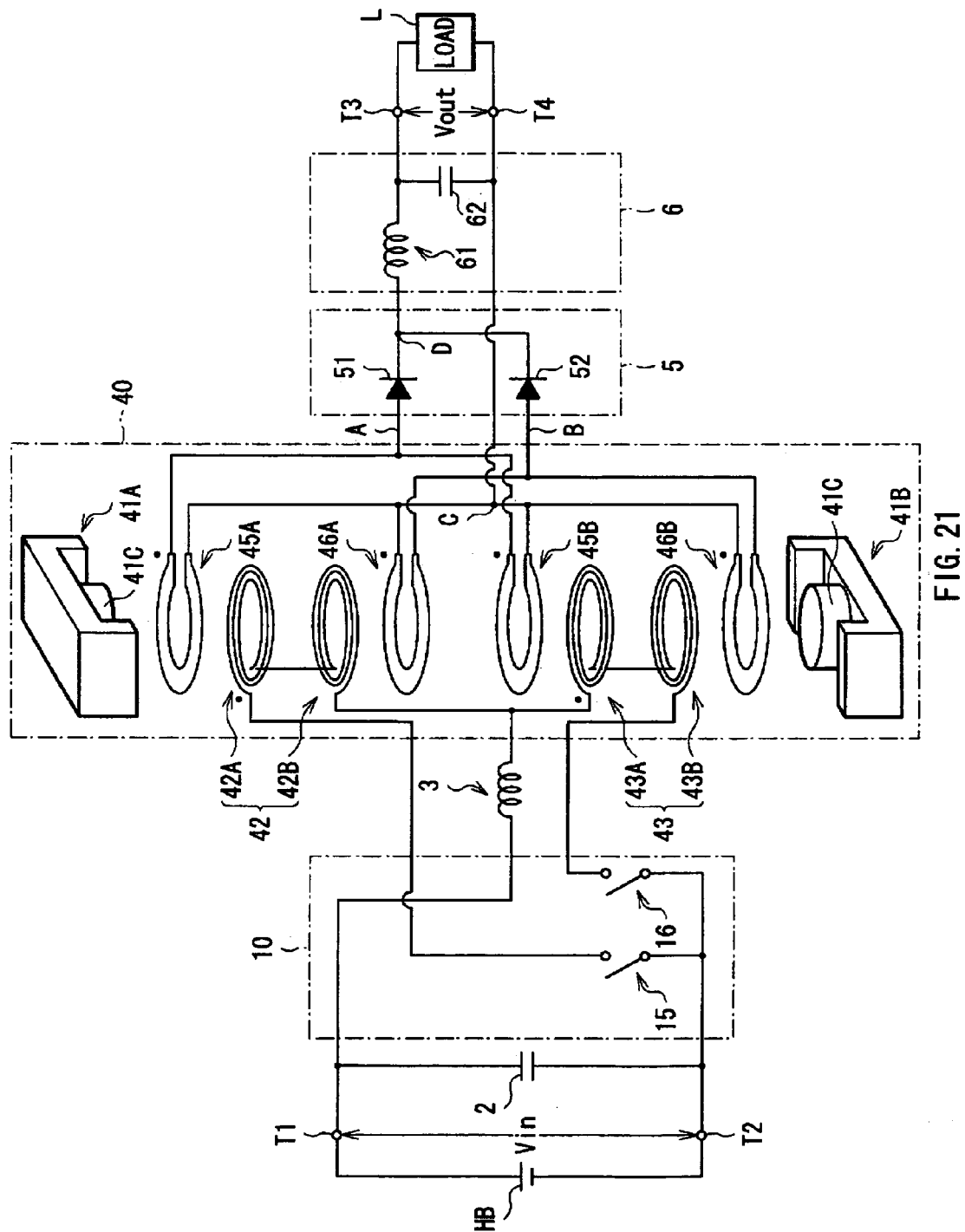
FIG. 21 is a structural drawing of the switching power supply unit of FIG. 20.

FIG. 20 shows a circuit configuration of a switching power supply unit according to a second embodiment of the invention. FIG. 21 shows a structure of a transformer in the switching power supply unit of FIG. 20 in an exploded manner. The switching power supply unit is different from the first embodiment in a configuration of an inverter circuit 10, a connection relationship between the inverter circuit 10 and a transformer 40, and a configuration of the transformer 40. Thus, different points from the first embodiment are mainly described hereinafter, and configurations, operation, and effects common to the first embodiment are appropriately omitted to be described.

The inverter circuit 10 is a push-pull type switching circuit including two switching elements 15 and 16 connected in parallel, the switching elements 15 and 16 being driven according to a switching signal supplied from a control circuit (not shown).

The transformer 40 is configured by stacking respective windings in an order different from that in the transformer 4 in the above embodiment. Specifically, the secondary winding 45B is counterchanged with the secondary winding 46A in the stacking structure of the transformer 4 in the above embodiment, that is, respective windings are disposed by stacking the secondary winding 45A (first secondary-sub-winding group), primary winding 42A (first primary-sub-winding group), primary winding 42B (second primary-sub-winding group), secondary winding 46A (third secondary-sub-winding group), secondary winding 45B (second secondary-sub-winding group), primary winding 43A (fourth primary-sub-winding group), primary winding 43B (third primary-sub-winding group), and secondary winding 46B (fourth secondary-sub-winding group) in that order from above. That is, a stacking structure of the transformer 40 is vertically symmetrical.

The switching element 15 is provided between one end of the primary winding 42A of the transformer 40 and the primary-side low-voltage line L1L. The switching element 16 is provided between one end of the primary wiring 43 and the primary-side high-voltage line L1H, and the switching element 14 is provided between one end of the primary wiring 43B and the primary-side low-voltage line L1L. A resonance inductor 3 is provided between a connection point between the primary winding 42B and the primary winding 43A, and the primary-side high-voltage line L1H.

Figure 22:
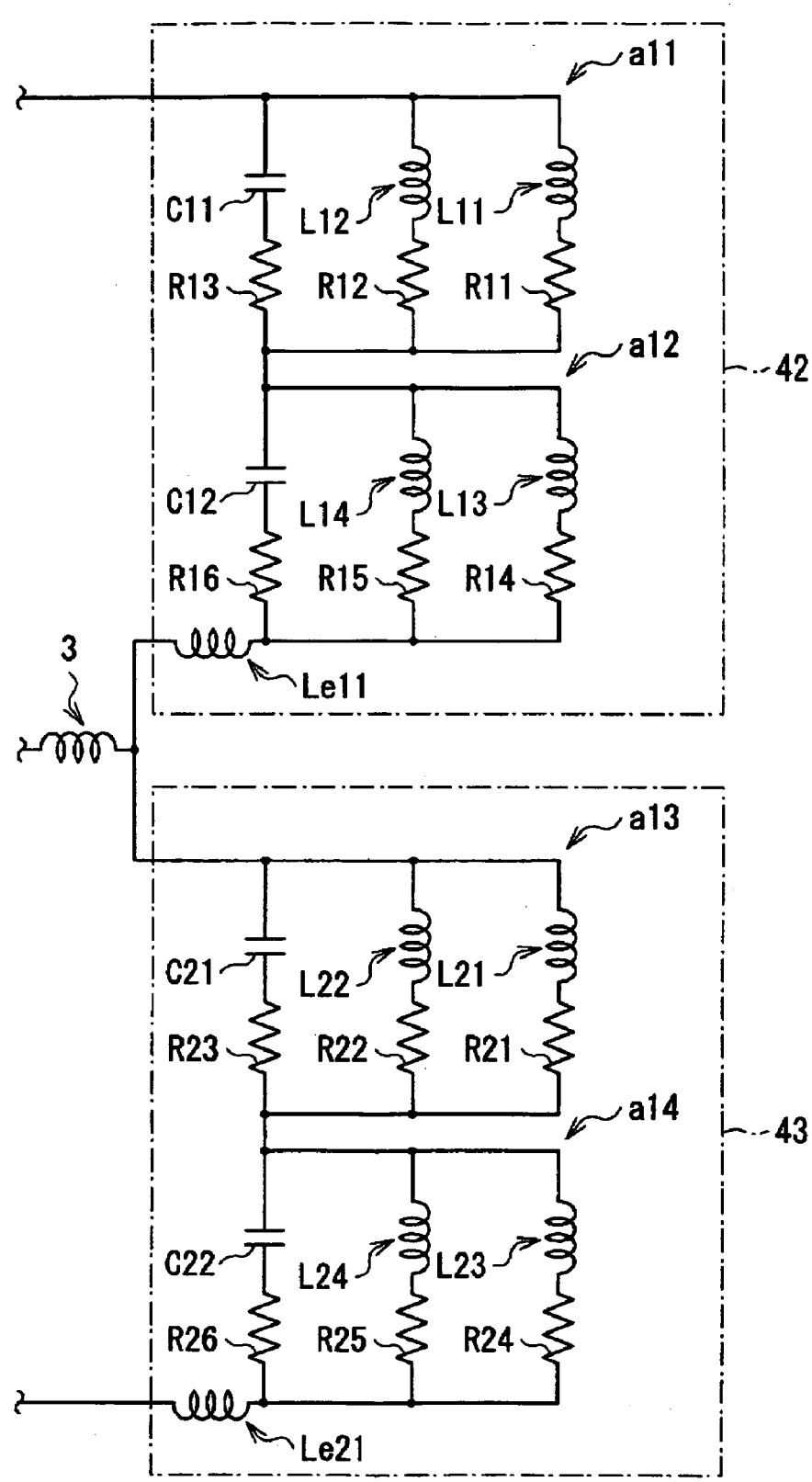
FIG. 22 is an equivalent circuit diagram of a primary winding of a transformer in FIG. 20.

Here, the primary winding of the transformer 40, that is, the primary winding 44 including the primary winding 42 and the primary winding 43 can be expressed by an equivalent circuit as shown in FIG. 22. First, an equivalent circuit of the primary winding 42 includes a circuit a11, a circuit a12, and inductance Le11 connected in series to one another. The circuit a11 is configured by inductance L11 and resistance R11 connected in series to each other, inductance L12 and resistance R12 connected in series to each other, and line capacitance C11 and resistance R13 connected in series to each other, which are connected in parallel to one another. The circuit a12 is configured by inductance L13 and resistance R14 connected in series to each other, inductance L14 and resistance R15 connected in series to each other, and line capacitance C12 and resistance R16 connected in series to each other, which are connected in parallel to one another. On the other hand, an equivalent circuit of the primary winding 43 includes a circuit a13, a circuit a14, and inductance Le21 connected in series to one another. The circuit a13 is configured by inductance L21 and resistance R21 connected in series to each other, inductance L22 and resistance R22 connected in series to each other, and line capacitance C21 and resistance R23 connected in series to each other, which are connected in parallel to one another. The circuit a14 is configured by inductance L23 and resistance R24 connected in series to each other, inductance L24 and resistance R25 connected in series to each other, and line capacitance C22 and resistance R26 connected in series to each other, which are connected in parallel to one another.

In the equivalent circuit of the primary winding 42, the inductance L11 is inductance of the primary winding 42A when the transformer 40 is assumed as an ideal transformer, and the resistance R11 is resistance of the primary winding 42A when the transformer 40 is assumed as an ideal transformer. The inductance L12 is excitation inductance of the primary winding 42A, and the resistance R12 is an AC resistance component of the primary winding 42A. The line capacitance C11 is total capacitance of line capacitance in the primary winding 42A and line capacitance of the primary winding 42A and secondary windings 45 and 46; and the resistance R13 is an AC resistance component of the primary winding 42A. The inductance L13 is inductance of the primary winding 42B when the transformer 40 is assumed as an ideal transformer, and the resistance R14 is resistance of the primary winding 42B when the transformer 40 is assumed as an ideal transformer. The inductance L14 is excitation inductance of the primary winding 42B, and the resistance R15 is an AC resistance component of the primary winding 42B. The line capacitance C12 is total capacitance of line capacitance in the primary winding 42B and line capacitance of the primary winding 42B and the secondary windings 45 and 46; and the resistance R16 is an AC resistance component of the primary winding 42B. The inductance Le11 is leakage inductance of the transformer configured by the primary winding 42 and the secondary windings 45 and 46.

In the equivalent circuit of the primary winding 43, the inductance L21 is inductance of the primary winding 43A when the transformer 40 is assumed as an ideal transformer, and the resistance R21 is resistance of the primary winding 43A when the transformer 40 is assumed as an ideal transformer. The inductance L22 is excitation inductance of the primary winding 43A, and the resistance R22 is an AC resistance component of the primary winding 43A. The line capacitance C21 is total capacitance of line capacitance in the primary winding 43A and line capacitance of the primary winding 43A and secondary windings 45 and 46; and the resistance R23 is an AC resistance component of the primary winding 43A. The inductance L23 is inductance of the primary winding 43B when the transformer 40 is assumed as an ideal transformer, and the resistance R24 is resistance of the primary winding 43B when the transformer 40 is assumed as an ideal transformer. The inductance L24 is excitation inductance of the primary winding 43B, and the resistance R25 is an AC resistance component of the primary winding 43B. The line capacitance C22 is total capacitance of line capacitance in the primary winding 43B and line capacitance of the primary winding 43B and the secondary windings 45 and 46; and the resistance R26 is an AC resistance component of the primary winding 43B. The inductance Le21 is leakage inductance of the transformer configured by the primary winding 43 and the secondary windings 45 and 46.

Next, operation of the switching power supply unit in a configuration as above is described. When the switching element 15 of the inverter circuit 1 is turned on, the current Iin1 flows in a direction from the resonance inductor 3 to the switching element 15 through the primary winding 42B and the primary winding 42A, and the voltage Vin1 induces on the primary winding 42, and the current Iin1 flows into the primary winding 42A and the primary winding 42B configuring the primary winding 42. On the other hand, a voltage induces on the secondary windings 45 and 46 of the transformer 40, the voltage being in a reverse direction to the diode 52, and in a forward direction to the diode 51. Therefore, the current Iout1 flows into the output line LO and the ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

Next, when the switching element 15 is switched from on to off, a voltage in a forward direction to the diode 52 induces on the secondary windings 45 and 46 of the transformer 40. Therefore, a current flows into the output line LO and the ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

Next, When the switching element 16 is turned on, a current flows in a direction from the resonance inductor 3 to the switching element 16 through the primary winding 43A and the primary winding 43B, and the voltage Vin2 induces on the primary winding 43, and the current Iin2 flows into the primary winding 43A and the primary winding 43B configuring the primary winding 43. On the other hand, a voltage induces on the secondary windings 45 and 46 of the transformer 40, the voltage being in a forward direction to the diode 52, and in a reverse direction to the diode 51. Therefore, the current Iout2 flows into the output line LO and the ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

Finally, when the switching element 16 is switched from on to off, a voltage in a forward direction to the diode 51 induces on the secondary windings 45 and 46 of the transformer 40. Therefore, a current flows into the output line LO and the ground line LG through the secondary winding 45, chalk coil 61, and smoothing capacitor 62. At that time, the voltage Vout smoothed by the smoothing circuit 6 is outputted to the output terminals T3 and T4 connected in parallel to the smoothing capacitor 62.

In this way, the switching power supply unit transforms (steps down) the DC input voltage Vin supplied from a high-voltage battery into the DC output voltage Vout, and feeds the transformed DC output voltage Vout to a low-voltage buttery.

Next, advantages of the switching power supply unit of the embodiment are described.

Figure 23:
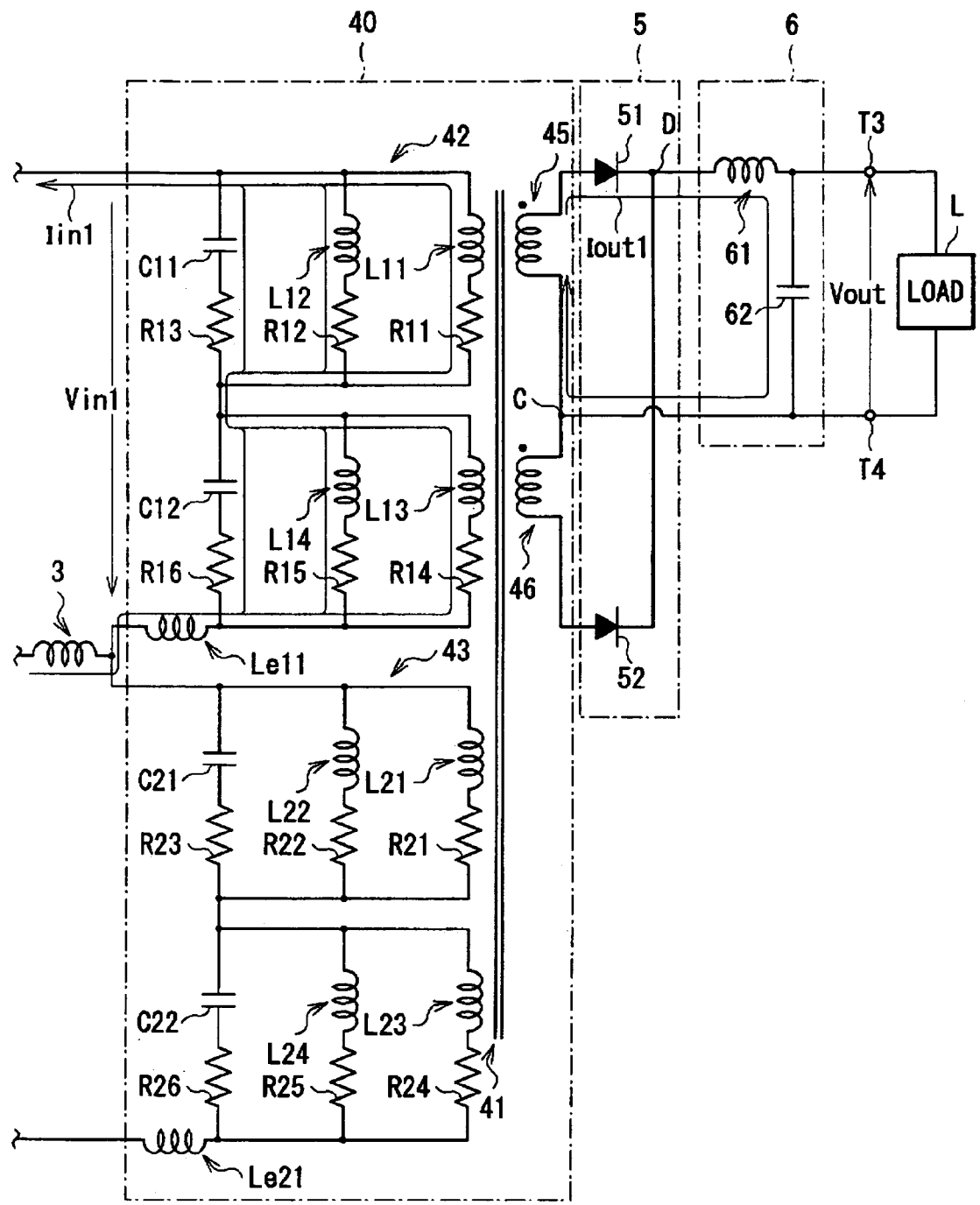
FIG. 23 is a circuit diagram for explaining operation of the switching power supply unit of FIG. 20.

In the embodiment, as shown in FIG. 23, when the voltage Vin1 is inputted into the primary winding 42, the current Iin1 flows into the primary winding 42A and the primary winding 42B configuring the primary winding 42. Here, since the primary winding 42A is disposed nearer to the secondary winding 45 into which current is flowing, it magnetically coupled with the secondary winding 45 relatively strongly. At that time, since a current direction is opposite to each other in principle of the transformer between the primary winding 42A and the secondary winding 45, AC resistance is decreased in the primary winding 42A because influence of the proximity effect is reduced, compared with a case that winding groups having the same current direction are approximated to each other. On the other hand, since the primary winding 42B is disposed far from the secondary winding 45 into which current is flowing, it magnetically coupled with the secondary winding 45 relatively loosely. At that time, since the primary winding 42B is disposed nearer to the secondary winding 46 into which current is not flowing, AC resistance is increased in the primary winding 42B due to the proximity effect, compared with the primary winding 42A. However, since the primary winding 42A and the primary winding 42B are connected in series to each other in the embodiment, the current equal to each other flows into each of the primary winding 42A and the primary winding 42B.

Figure 24:
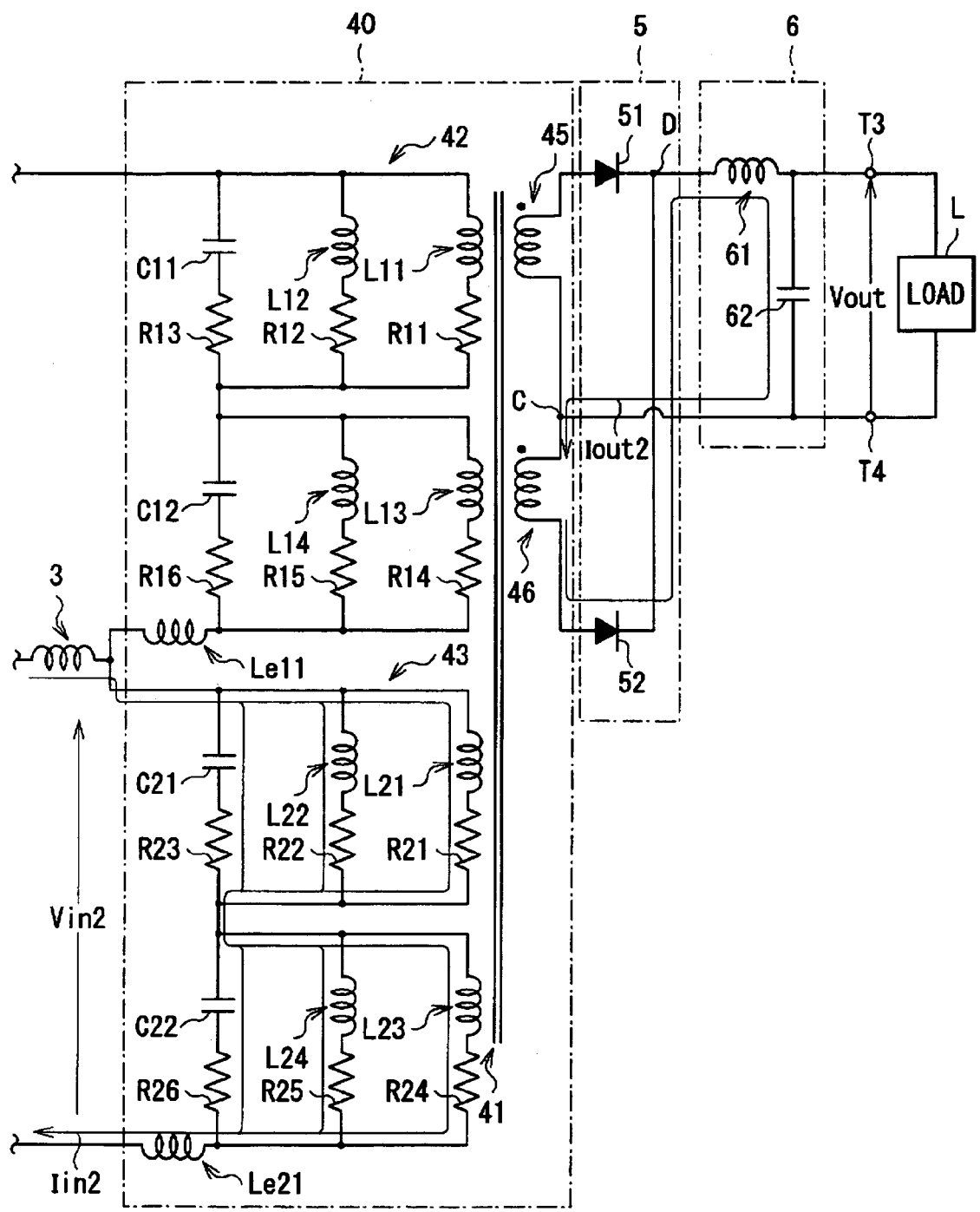
FIG. 24 is another circuit diagram for explaining operation of the switching power supply unit of FIG. 20.

Moreover, as shown in FIG. 24, when the voltage Vin2 is inputted into the primary winding 43, the current Iin2 flows into the primary winding 43A and the primary winding 43B configuring the primary winding 43. Here, since the primary winding 43B is disposed nearer to the secondary winding 46 into which current is flowing, it magnetically coupled with the secondary winding 46 relatively strongly. At that time, since a current direction is opposite to each other in principle of the transformer between the primary winding 43B and the secondary winding 46, AC resistance is decreased in the primary winding 43B because influence of the proximity effect is reduced, compared with the case that winding groups having the same current direction are approximated to each other. On the other hand, since the primary winding 43A is disposed far from the secondary winding 46 into which current is flowing, it magnetically coupled with the secondary winding 46 relatively loosely. At that time, since the primary winding 43A is disposed nearer to the secondary winding 45 into which current is not flowing, AC resistance is increased in the primary winding 43A due to the proximity effect, compared with the primary winding 43B. However, since the primary winding 43A and the primary winding 43B are connected in series to each other in the embodiment, the current equal to each other flows into each of the primary winding 43A and the primary winding 43B.

In this way, in the embodiment, since the primary winding 42A and the primary winding 42B, as well as the primary winding 43A and the primary winding 43B are connected in serial to each other, large current flows even into a winding having large AC resistance. Therefore, ringing generated in an output AC voltage of the transformer 40 (voltage between an end A and an end B in FIGS. 20 and 21) can be attenuated by high AC resistance as in the first embodiment, the ringing being caused by LC resonance due to line capacitance C21, excitation inductance L22, and leakage inductance Le11, or LC resonance due to line capacitance C22, excitation inductance L24, and leakage inductance Le21. As a result, core loss in the transformer 40 or a level of heating due to AC resistance of the transformer 40 is decreased, consequently efficiency is improved.

Moreover, since a stacking structure of respective windings of the transformer 40 (primary winding 42A, primary winding 42B, primary winding 43A, primary winding 43B, secondary winding 45A, secondary winding 45B, secondary winding 46A, and secondary winding 46B) is vertically symmetrical in the embodiment, a magnitude of AC resistance of the transformer 40 is not substantially different between a case that the secondary winding 45 is driven, and a case that the secondary winding 46 is driven. Accordingly, since an attenuation level of ringing is not substantially different between an output AC voltage when the secondary winding 45 is driven and an output AC voltage when the secondary winding 46 is driven, a heating level is not periodically increased, consequently high efficiency can be kept.

Modification of the Second Embodiment

Figure 25:
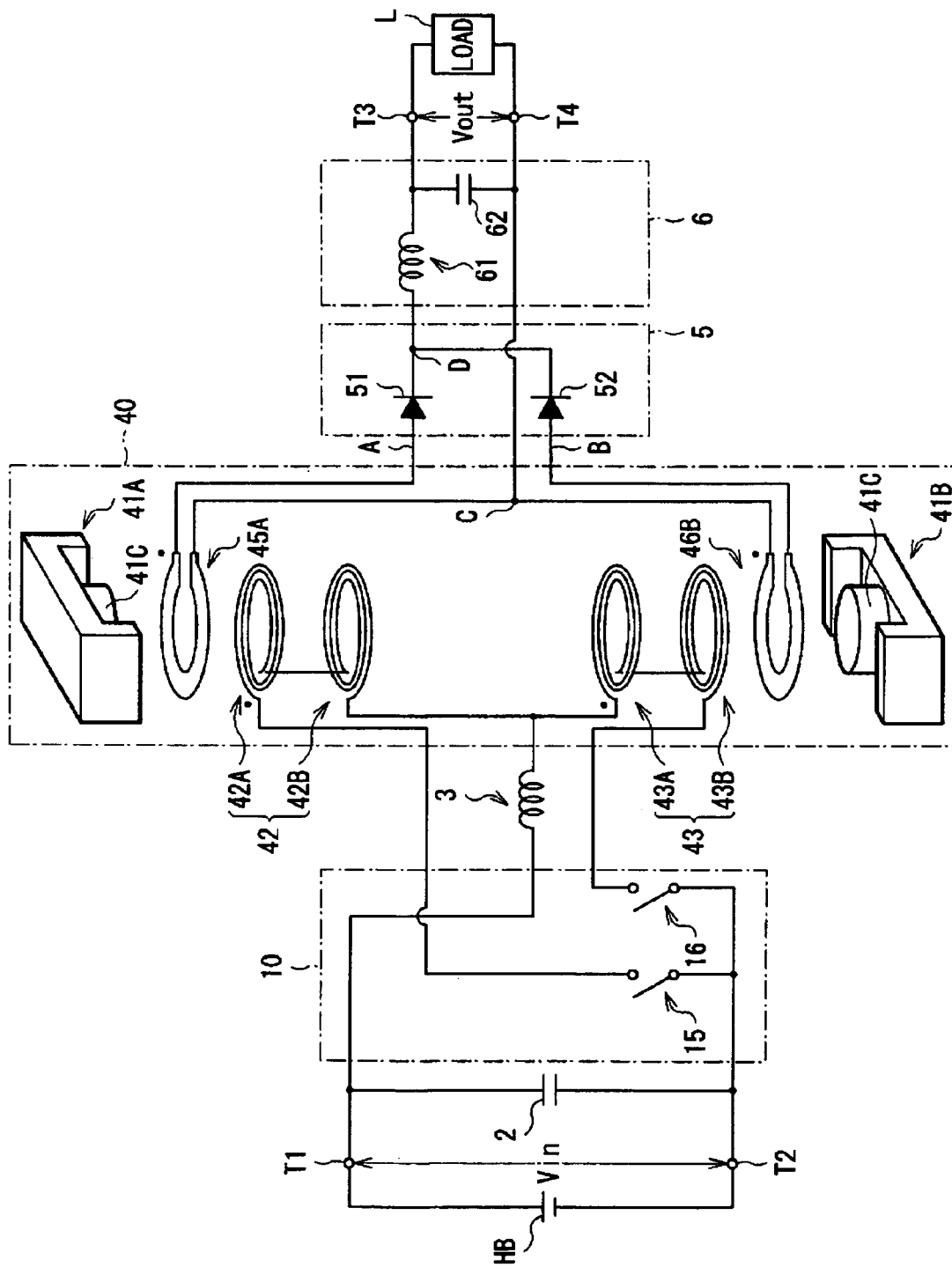
FIG. 25 is a circuit diagram of a switching power supply unit according to a modification.
Figure 26:
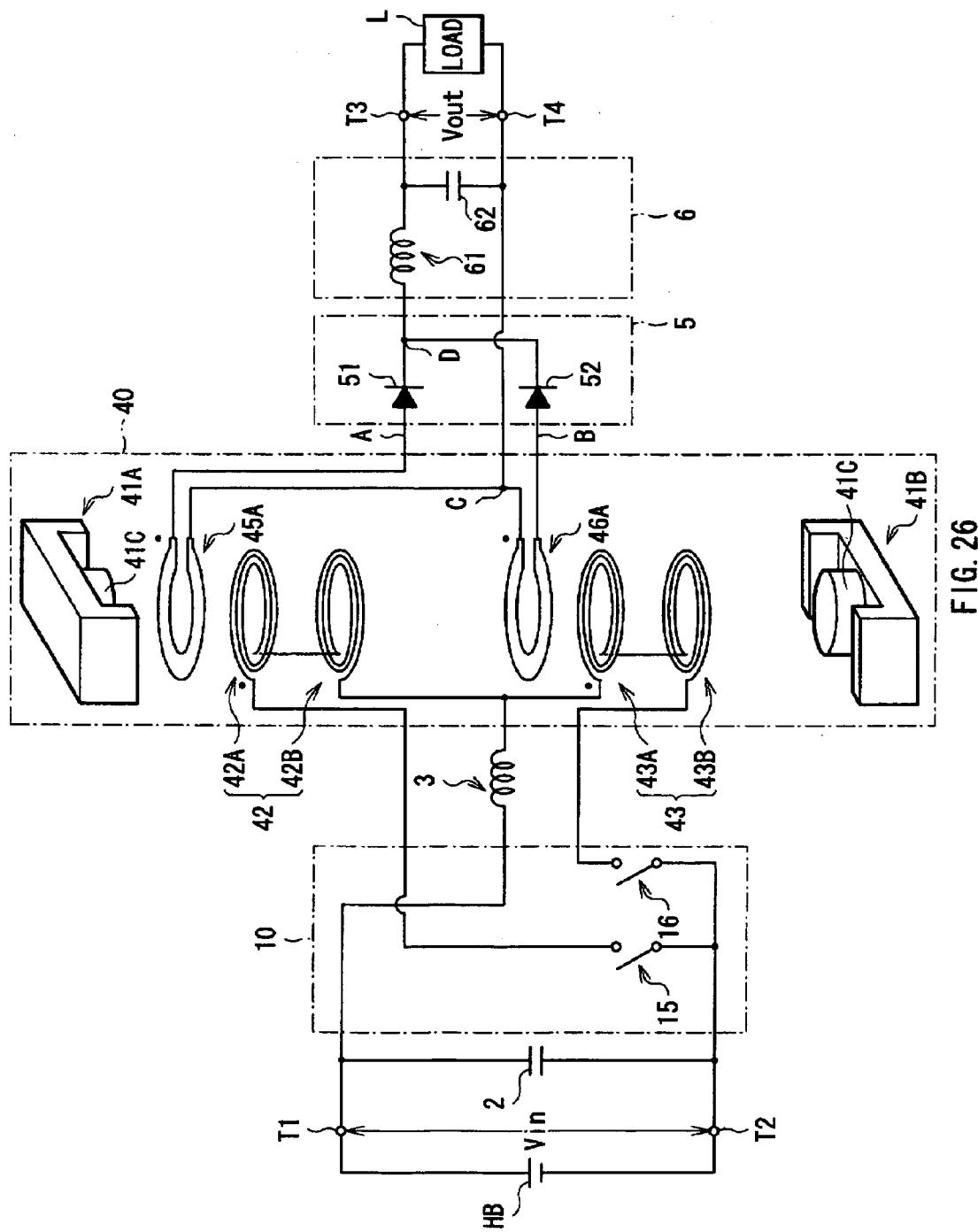
FIG. 26 is a circuit diagram of a switching power supply unit according to another modification.

While respective windings of the transformer 40 are disposed by stacking the secondary winding 45A, primary winding 42A, primary winding 42B, secondary winding 46A, secondary winding 45B, primary winding 43A, primary winding 43B, and secondary winding 46B in that order from above in the embodiment, the secondary winding 45B and the secondary winding 46A may be omitted while vertically symmetric arrangement is kept as shown in FIG. 25. While vertically symmetric arrangement is not given, the secondary winding 45B and the secondary winding 46B may be omitted as shown in FIG. 26. In FIG. 26, the primary winding 43A corresponds to the third primary-sub-winding group and the primary winding 43B corresponds to the fourth primary-sub-winding group. In each case, it is enough that large AC resistance is disposed in series in the primary winding 44.

Figure 16:
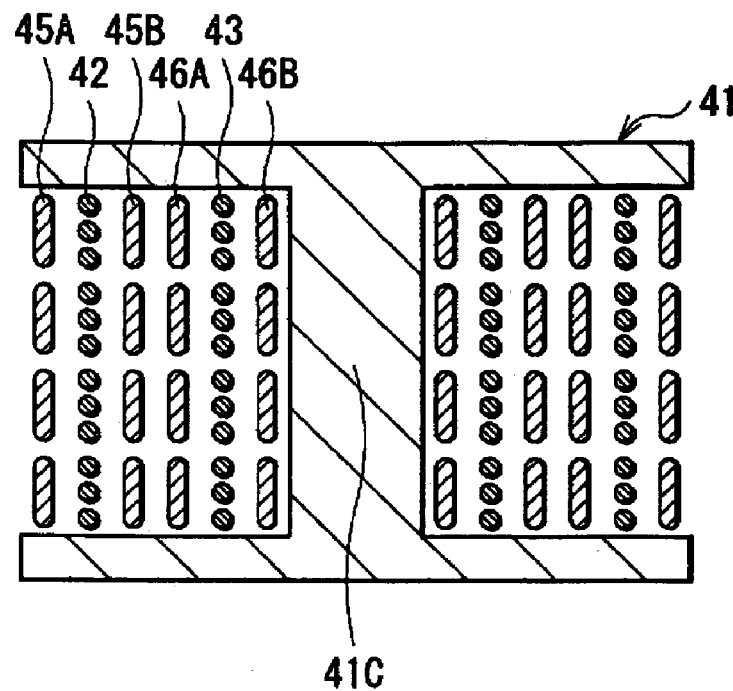
FIG. 16 is a circuit diagram of a switching power supply unit according to still another modification.
Figure 17:
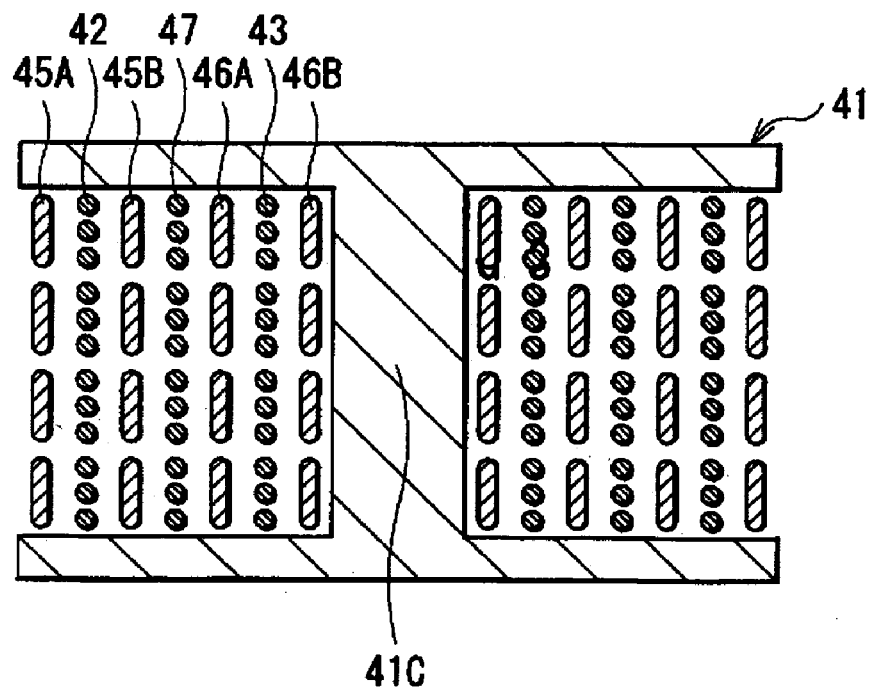
FIG. 17 is a circuit diagram of a switching power supply unit according to still another modification.
Figure 18:
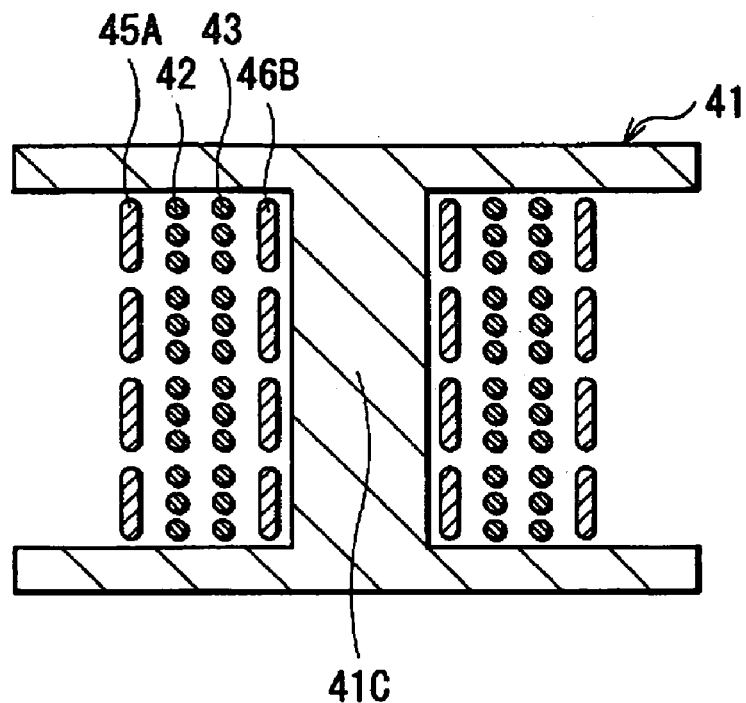
FIG. 18 is a circuit diagram of a switching power supply unit according to still another modification.
Figure 19:
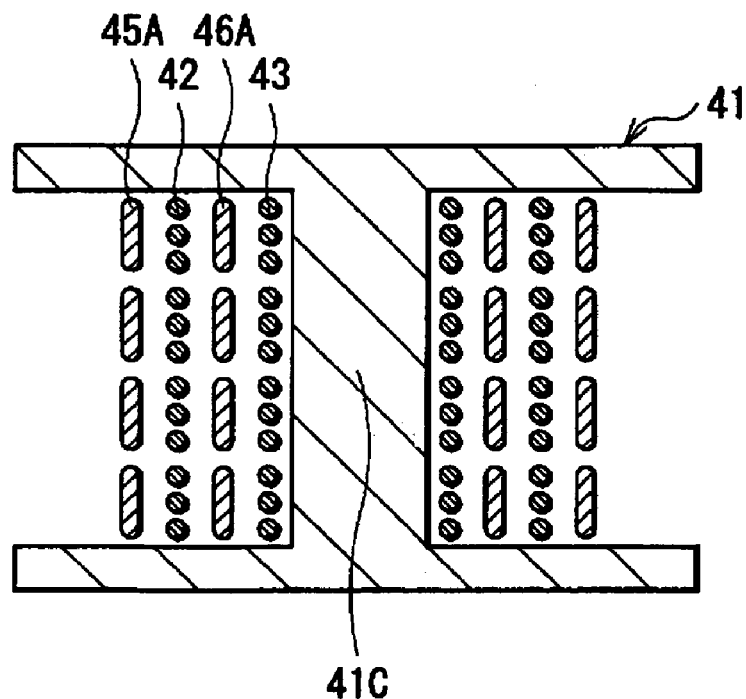
FIG. 19 is a circuit diagram of a switching power supply unit according to still another modification.

Moreover, while respective windings of the transformer 40 is wound on the center pillar 41C in the plane perpendicular to the extending direction of the center pillar 41C in the embodiment, they may be wound on the center pillar 41C in the cylindrical surface parallel to the extending direction of the center pillar 41C, as shown in FIGS. 16, 18 and 19.

While the invention has been described with embodiments, the invention is not limited to these, and various modifications and variations are possible.

For example, while the equivalent circuit of the secondary side of the transformer 4 or 40 is configured to be in the cathode common connection in the embodiments, it may be configured to be in an anode common connection.

Figure 27:
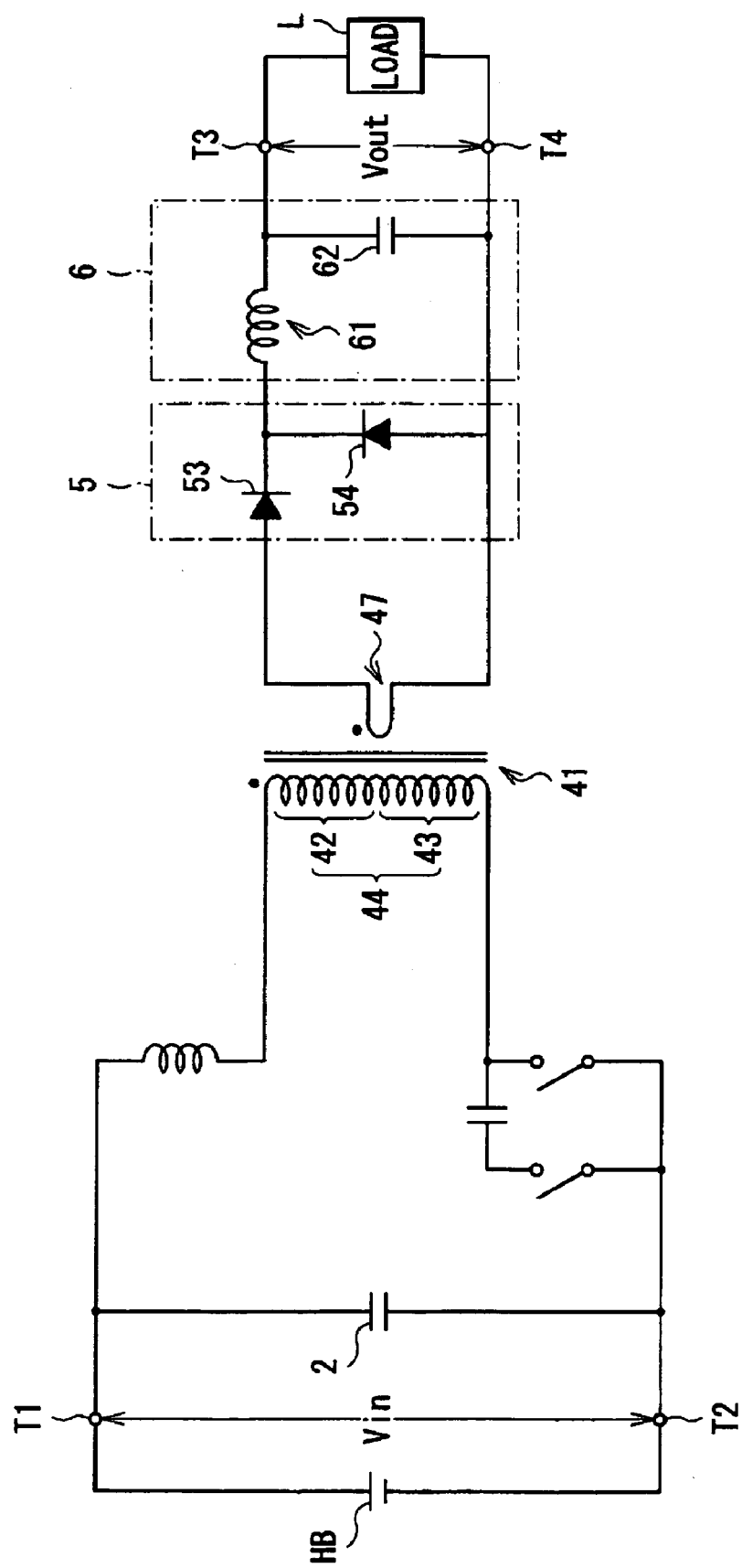
FIG. 27 is a circuit diagram of a switching power supply unit according to still another modification.
Figure 28:
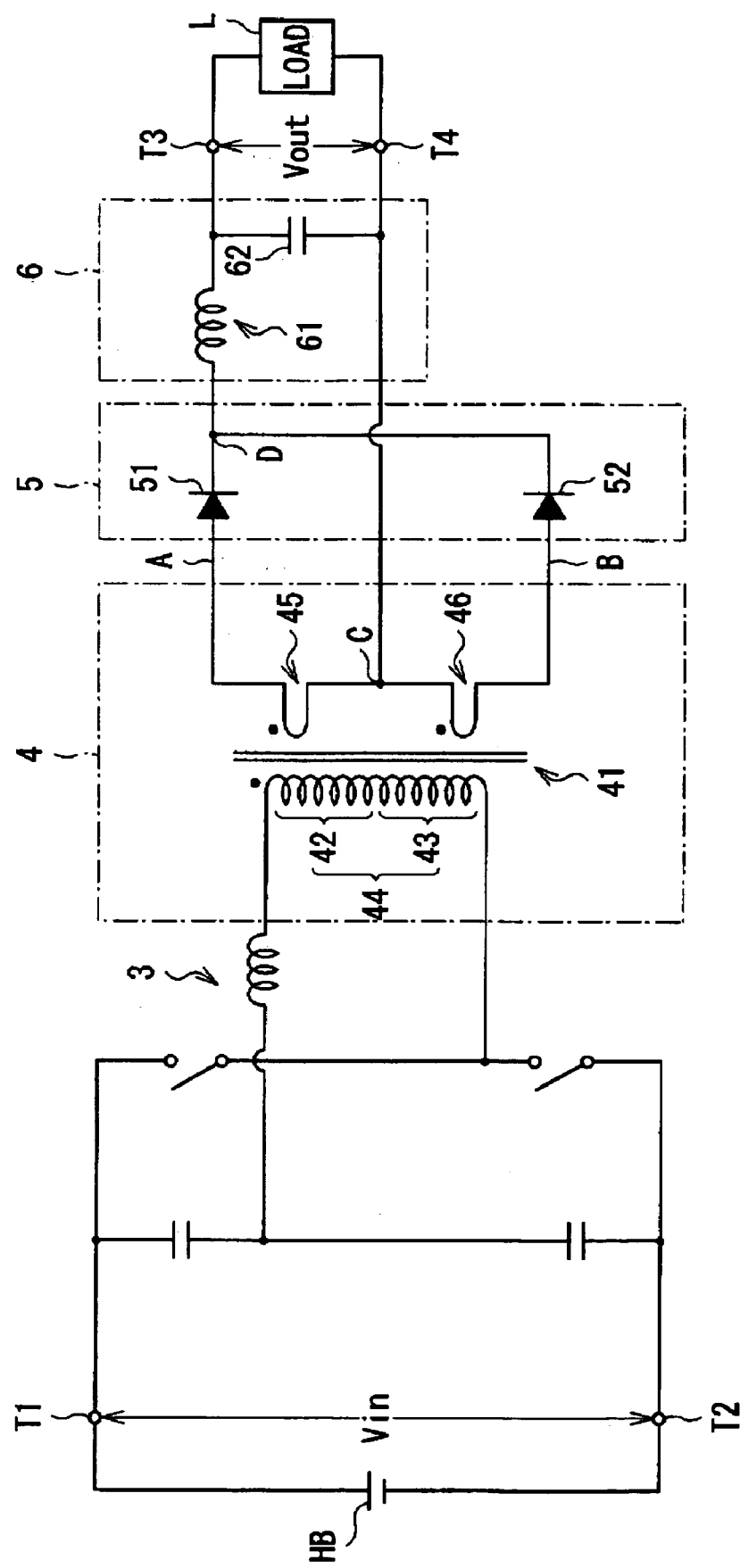
FIG. 28 is a circuit diagram of a switching power supply unit according to still another modification.

Moreover, while the inverter circuit 1 or 10 is in the full-bridge type or push-pull type in the embodiments, it may be in the forward type as illustrated in FIG. 27, or in the half-bridge type as illustrated in FIG. 28.

It should be understood by those skilled in the art that various modifications, combinations, sub-combinations and alterations may occur depending on design requirements and other factors insofar as they are within the scope of the appended claims or the equivalents thereof.

What is claimed is:

1. A switching power supply unit comprising:
    a transformer having a primary-winding group including a first primary-winding group and a second primary-winding group connected in series to each other, and a secondary-winding group including a first secondary-winding group and a second secondary-winding group connected to each other;
    a switching circuit performing switching operation to allow a current direction of the primary-winding group to be changed in a time-divisional manner; and
    a rectifier-and-smoother circuit rectifying and smoothing AC voltage induced on the secondary-winding group in response to operation of the switching circuit,
    wherein the first secondary-winding group and the second secondary-winding group are driven in a time divisional manner in phases opposite to each other in response to operation of the switching circuit,
    magnetic coupling between the first primary-winding group and the secondary-winding group is relatively strong when the first secondary-winding group is driven, while it is relatively loose when the second secondary-winding group is driven, and
    magnetic coupling between the second primary-winding group and the secondary-winding group is relatively loose when the first secondary-winding group is driven, while it is relatively strong when the second secondary-winding group is driven.

2. A switching power supply unit comprising:
    a transformer having a primary-winding group including a first primary-winding group and a second primary-winding group connected in series to each other, and a secondary-winding group including a first secondary-winding group and a second secondary-winding group connected to each other;
    a switching circuit performing switching operation to allow a current direction of the primary-winding group to be changed in a time-divisional manner; and
    a rectifier-and-smoother circuit having a first rectifier element and a second rectifier element, the first and second rectifier elements being connected to the secondary-winding group to allow the first secondary-winding group and the second secondary-winding group to be driven in a time-divisional manner in phases opposite to each other in response to operation of the switching circuit, thereby rectifying and smoothing AC voltage induced on the secondary-winding group in response to operation of the switching circuit,
    wherein the first primary-winding group is disposed near the first secondary-winding group rather than the second secondary-winding group, and
    the second primary-winding group is disposed near the second secondary-winding group rather than the first secondary-winding group.

3. The switching power supply unit according to claim 1, wherein the transformer has a magnetic core having a center pillar, and
    the first secondary-winding group, second secondary-winding group, first primary-winding group, and second primary-winding group are wound in a plane perpendicular to an extending direction of the center pillar.

4. The switching power supply unit according to claim 3, wherein the first secondary-winding group, first primary-winding group, second primary-winding group, and second secondary-winding group are stacked in that order.

5. The switching power supply unit according to claim 3, wherein the first secondary-winding group, first primary-winding group, second secondary-winding group, and second primary-winding group are stacked in that order.

6. The switching power supply unit according to claim 3, wherein the first secondary-winding group includes a first secondary-sub-winding group and a second secondary-sub-winding group connected in parallel to each other, and the second secondary-winding group includes a third secondary-sub-winding group and a fourth secondary-sub-winding group connected in parallel to each other, and the first secondary-sub-winding group, first primary-winding group, second secondary-sub-winding group, third secondary-sub-winding group, second primary-winding group, and fourth secondary-sub-winding group are stacked in that order.

7. The switching power supply unit according to claim 2, wherein the transformer has a magnetic core having a center pillar, and the first secondary-winding group, second secondary-winding group, first primary-winding group, and second primary-winding group are wound in a cylindrical surface parallel to an extending direction of the center pillar.

8. The switching power supply unit according to claim 7, wherein the first secondary-winding group, first primary-winding group, second primary-winding group, and second secondary-winding group are stacked in that order.

9. The switching power supply unit according to claim 7, wherein the first secondary-winding group, first primary-winding group, second secondary-winding group, and second primary-winding group are stacked in that order.

10. The switching power supply unit according to claim 7, wherein the first secondary-winding group includes a first secondary-sub-winding group and a second secondary-sub-winding group connected in parallel to each other, and the second secondary-winding group includes a third secondary-sub-winding group and a fourth secondary-sub-winding group connected in parallel to each other, and the first secondary-sub-winding group, first primary-winding group, second secondary-sub-winding group, third secondary-sub-winding group, second primary-winding group, and fourth secondary-sub-winding group are stacked in that order.

11. A switching power supply unit comprising:
a transformer having a primary-winding group including a first primary-winding group and a second primary-winding group connected to each other, and a secondary-winding group including a first secondary-winding group and a second secondary-winding group connected to each other;
a switching circuit performing switching operation to allow the first primary-winding group and the second primary-winding group to be driven in a time-divisional manner in phases opposite to each other; and
a rectifier-and-smoother circuit rectifying and smoothing AC voltage induced on the secondary-winding group in response to operation of the switching circuit,
wherein the first secondary-winding group and the second secondary-winding group are driven in a time-divisional manner in phases opposite to each other in response to operation of the switching circuit,
the first primary-winding group includes a first primary-sub-winding group and a second primary-sub-winding group connected in series to each other, magnetic coupling between the first primary-sub-winding group and the secondary-winding group being relatively strong when the first secondary-winding group is driven, while magnetic coupling between the second primary-sub-winding group and the secondary-winding group being relatively loose when the first secondary-winding group is driven, and the second primary-winding group includes a third primary-sub-winding group and a fourth primary-sub-winding group connected in series to each other, magnetic coupling between the third primary-sub-winding group and the secondary-winding group being relatively strong when the second secondary-winding group is driven, while magnetic coupling between the fourth primary-sub-winding group and the secondary-winding group being relatively loose when the second secondary-winding group is driven.

12. A switching power supply unit comprising:
a transformer having a primary-winding group including a first primary-winding group and a second primary-winding group connected to each other, and a secondary-winding group including a first secondary-winding group and a second secondary-winding group connected to each other;
a switching circuit performing switching operation to allow the first primary-winding group and the second primary-winding group to be driven in a time-divisional manner in phases opposite to each other; and
a rectifier-and-smoother circuit having a first rectifier element and a second rectifier element connected to the secondary-winding group to allow the first secondary-winding group and the second secondary-winding group to be driven in a time-divisional manner in phases opposite to each other in response to operation of the switching circuit, thereby rectifying and smoothing AC voltage induced on the secondary-winding group in response to operation of the switching circuit,
wherein the first primary-winding group includes a first primary-sub-winding group and a second primary-sub-winding group connected in series to each other, the first primary-sub-winding group being disposed near the first secondary-winding group rather than the second secondary-winding group, and the second primary-sub-winding group being disposed near the second secondary-winding group rather than the first secondary-winding group, and the second primary-winding group includes a third primary-sub-winding group and a fourth primary-sub-winding group connected in series to each other, the third primary-sub-winding group being disposed near the second secondary-winding group rather than the first secondary-winding group, and the fourth primary-sub-winding group being disposed near the first secondary-winding group rather than the second secondary-winding group.

13. The switching power supply unit according to claim 11,
wherein the transformer has a magnetic core having a center pillar, and
the first secondary-winding group, second secondary-winding group, first primary-sub-winding group, second primary-sub-winding group, third primary-sub-winding group, and fourth primary-sub-winding group are wound in a plane perpendicular to an extending direction of the center pillar.

14. The switching power supply unit according to claim 13,
wherein the first secondary-winding group, first primary-sub-winding group, second primary-sub-winding group, second secondary-winding group, third primary-sub-winding group, and fourth primary-sub-winding group are stacked in that order.

15. The switching power supply unit according to claim 13,
wherein the first secondary-winding group, first primary-sub-winding group, second primary-sub-winding group, fourth primary-sub-winding group, third primary-sub-winding group, and second secondary-winding group are stacked in that order.

16. The switching power supply unit according to claim 13,
wherein the first secondary-winding group includes a first secondary-sub-winding group and a second secondary-sub-winding group connected in parallel to each other, and the second secondary-winding group includes a third secondary-sub-winding group and a fourth secondary-sub-winding group connected in parallel to each other, and
the first secondary-sub-winding group, first primary-sub-winding group, second primary-sub-winding group, third secondary-sub-winding group, second secondary-sub-winding group, fourth primary-sub-winding group, third primary-sub-winding group, and fourth secondary-sub-winding group are stacked in this order.

17. The switching power supply unit according to claim 12,
wherein the transformer has a magnetic core having a center pillar, and
the first secondary-winding group, second secondary-winding group, first primary-sub-winding group, second primary-sub-winding group, third primary-sub-winding group, and fourth primary-sub-winding group are wound in a cylindrical surface parallel to an extending direction of the center pillar.

18. The switching power supply unit according to claim 17,
wherein the first secondary-winding group, first primary-sub-winding group, second primary-sub-winding group, second secondary-winding group, third primary-sub-winding group, and fourth primary-sub-winding group are stacked in that order.

19. The switching power supply unit according to claim 17,
wherein the first secondary-winding group, first primary-sub-winding group, second primary-sub-winding group,
fourth primary-sub-winding group, third primary-sub-winding group, and second secondary-winding group are stacked in that order.

20. The switching power supply unit according to claim 17,
wherein the first secondary-winding group includes a first secondary-sub-winding group and a second secondary-sub-winding group connected in parallel to each other, and the second secondary-winding group includes a third secondary-sub-winding group and a fourth secondary-sub-winding group connected in parallel to each other, and
the first secondary-sub-winding group, first primary-sub-winding group, second primary-sub-winding group, third secondary-sub-winding group, second secondary-sub-winding group, fourth primary-sub-winding group, third primary-sub-winding group, and fourth secondary-sub-winding group are stacked in that order.

* * * * *